United States Patent [19]

Edlund et al.

[11] Patent Number: 5,116,796
[45] Date of Patent: May 26, 1992

[54] ORGANIC SOLVENT SOLUBLE OXIDE SUPPORTED HYDROGENATION CATALYST PRECURSORS

[75] Inventors: David J. Edlund, Bend; Richard G. Finke, Eugene, both of Oreg.; Robert J. Saxton, Sunnyvale, Calif.

[73] Assignee: The University of Oregon, Eugene, Oreg.

[21] Appl. No.: 275,105

[22] PCT Filed: Feb. 26, 1988

[86] PCT No.: PCT/US88/00609
§ 371 Date: Oct. 26, 1988
§ 102(e) Date: Oct. 26, 1988

[87] PCT Pub. No.: WO88/06489
PCT Pub. Date: Sep. 7, 1988

[51] Int. Cl.⁵ .............................. B01J 31/22
[52] U.S. Cl. .................... 502/154; 502/155; 502/164; 502/204; 502/206; 502/209; 502/210; 502/211; 502/215; 502/227; 502/228; 502/242; 502/243; 502/246; 502/248; 502/254; 502/255; 502/305; 502/308; 502/309; 502/311; 502/312; 502/317; 502/318; 502/321

[58] Field of Search .......... 502/154, 155, 164, 204, 502/206, 209, 210, 211, 215, 227, 228, 242, 243, 246, 248, 254, 255, 305, 308, 309, 311, 312, 317, 318, 321

[56] References Cited

U.S. PATENT DOCUMENTS 4,294,989 10/1981 Knowles et al. ............ 502/154 X
4,720,474 1/1988 Vasilevskis et al. ......... 502/209 X
4,853,357 8/1989 Vasilevskis et al. ......... 502/209 X

OTHER PUBLICATIONS

Urabe et al, Chem. Letters, 1985 pp. 1595-1596.

Primary Examiner—Patrick P. Garvin
Attorney, Agent, or Firm—E. Thomas Wheelock

[57] ABSTRACT

The present invention discloses two polyoxoanion supported metal complexes found to be useful in olefin hydrogenation. The complexes are novel compositions of matter which are soluble in organic solvents. In particular, the compositions of matter comprise $A_x[L_nIr^{(I)} \cdot X_2M_{15} M'_3O_{62}]^{x-}$ and $A_y[L_nIr^{(I)} \cdot X_2M_9M'_3O_{40}]^{y-}$ where L is a ligand preferably chosen from 1,5-cyclooctadiene (COD), ethylene, cyclooctene, norbornadiene and other olefinic ligands; n=1 or 2 depending upon the number of double bonds present in the ligand L; X is a "hetero" atom chosen from B, Si, Ge, P, As, Se, Te, I, Co, Mn and Cu; M is either W or Mo; M' is preferably Nb or V but Ti, Zr, Ta, Hf are also useful; and A is a countercation preferably selected from tetrabutyl ammonium and alkali metal ions.

12 Claims, 6 Drawing Sheets

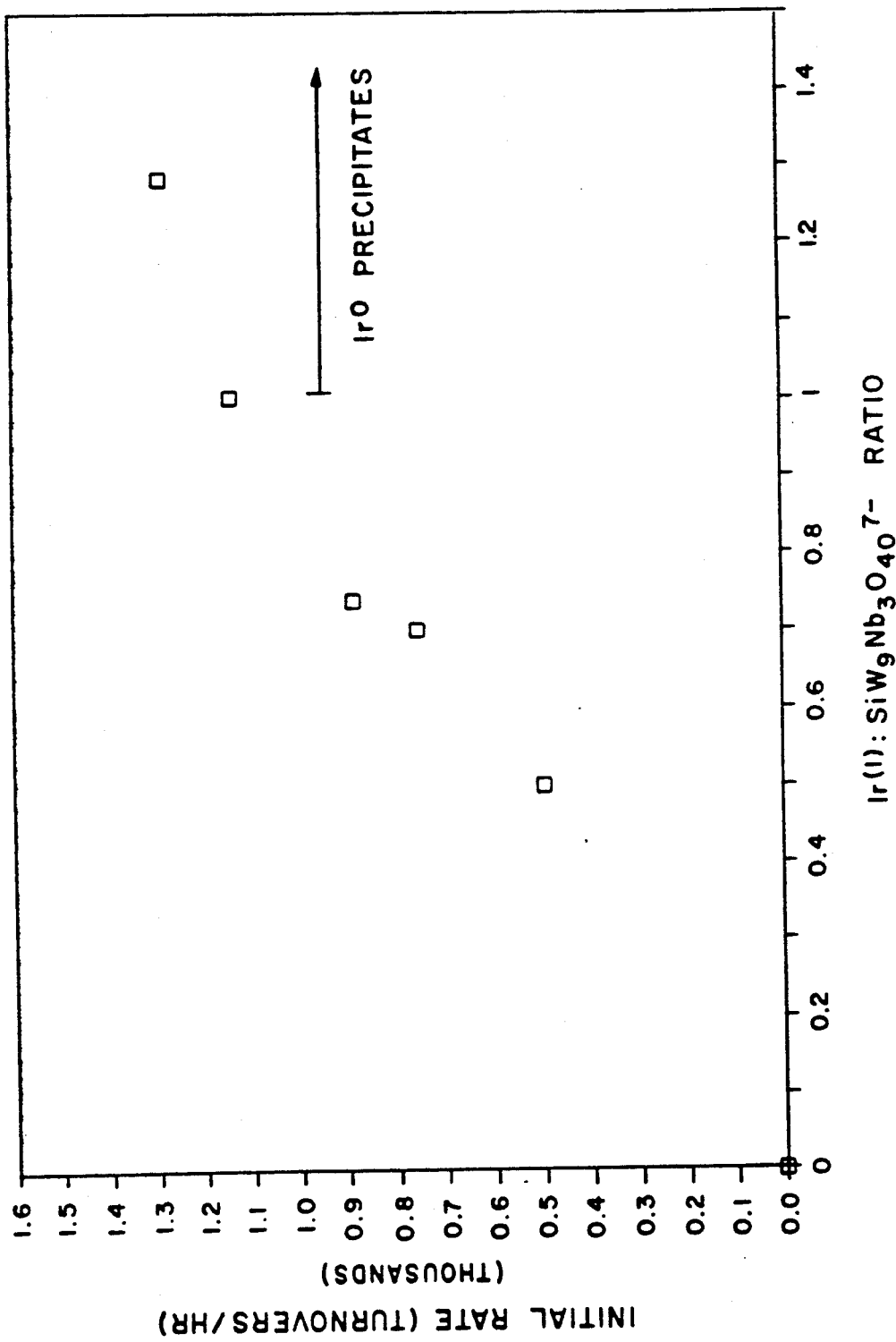
FIG._2

ORGANIC SOLVENT SOLUBLE OXIDE SUPPORTED HYDROGENATION CATALYST PRECURSORS

DESCRIPTION

1. Technical Field

This invention relates generally to organometallic complexes and their use in homogeneous catalysis, and more specifically to novel covalently bonded iridium-heteropolyanion species which are used as hydrogenation catalysts.

2. Background of the Invention

Catalysis by a bulk, oxide-supported metal two phase system, commonly referred to as heterogeneous catalysis, while generally producing high turnover frequencies and ease of product/catalyst separation, is plagued by a lack of chemical selectivity in addition to analytical difficulties in determining the chemical composition of the active site(s) as well as mechanistic details. Attempts to circumvent these short comings have primarily focused on chemically binding a discrete, well characterized organometallic moiety to a support, typically a polymer or silica substrate, thereby making the previously soluble organometallic complex insoluble and atomically dispersed. However, the usefulness of these "heterogenized" complexes as catalysts is limited by the same analytical difficulties associated with characterizing and doing mechanistic studies on bulk solid, two phase catalyst systems.

One recent report discloses a hydrogenation catalyst employing Rhodium and selected heteropolyanions (specifically $Li_4SiW_{12}O_{40}$ and $Li_4SiMo_{12}O_{40}$) (Urabe, K. et al., Chem. Lett., 1985, 1595). However, such polyoxanions have zero surface charge and therefore are unable to covalently bond to and support an organometallic. Therefore, this polyoxoanion system is considered less desirable because it will not hinder $Rh^{(0)}$ formation in a $Cl^-$ and $PPh_3$-free system, nor will it prevent attachment of $Rh^{(I)}$ to a cation exchange resin.

A different strategy is to synthesize soluble, oxide-supported organometallic catalyst precursors which could then be characterized and studied by employing a wide range of solution spectroscopic and kinetic methods. The present invention represents the first such examples of organic solvent soluble, atomically dispersed, oxide-supported catalyst precursors, covalently bonded iridium-heteropolyanions.

It is therefore an object of this invention to provide novel compounds wherein a covalent iridium-polyoxoanion bond remains stable under the conditions of catalytic hydrogenation.

It is a further object of this invention to provide catalyst systems which avoid $Ir^{(I)}$ formation under hydrogenation reaction conditions.

It is a further object of this invention to provide a catalyst system which can be readily and economically separated from the hydrogenation reaction mass by binding to an anion exchange resin.

It is a still further object of this invention to provide a catalyst system which is similar in chemical reactivity to atomically dispersed oxide-supported iridium complexes (e.g., $Ir/Al_2O_3$) while being homogeneous and soluble.

It is still a further object of the present invention to provide a covalently bonded Ir.polyoxoanion system which will support the metal on the polyoxoanion in a $Cl^-$ and $PPh_3$-free system.

It is yet another object of the invention to provide a covalently bonded Ir.polyoxoanion system which will impede $Ir^{(0)}$ formation in a $Cl^-$ and $PPh_3$-free system.

It is yet another object of the invention to provide a covalently bonded Ir.polyoxoanion system which will prevent attachment of $Ir^{(I)}$ to a cation exchange resin.

These and further objects of the invention will become apparent to those skilled in the art with reference to the description below.

SUMMARY OF THE INVENTION

The present invention provides novel liquid-phase olefin hydrogenation catalyst precursors which comprise either Dawson or Keggin structures represented in their ionic form by $[L_nIr^{(I)}.X_2M_{15}M'_3O_{62}]^{x-}$ and $[L_nIr^{(I)}.XM_9M'_3O_{40}]^{y-}$, respectively. L represents a ligand chosen from 1,5-cyclooctadiene (COD), ethylene, cyclooctene, norbornadiene and other olefinic ligands; n=1 or 2 depending upon the number of double bonds present in the ligand L. X is the "hetero" atom chosen from B, Si, Ge, P, As, Se, Te, I, Co, Mn and Cu. M is either W or Mo. M' is preferably Nb or V, but Ti, Zr, Ta, Hf are also useful. Preferred species of the novel compounds comprise $X^{+8}[L_nIr.P_2W_{15}Nb_3O_{62}]^{-8}$ and $Y^{+6}[L_nIr.SiW_9Nb_3O_{40}]^{-6}$. The first preferred species is prepared by reacting under nitrogen $(Bu_4N)_9P_2W_{15}Nb_3O_{62}$ with $[Ir(COD)(CH_3CN)_2]BF_4$ in the presence of acetonitrile to obtain $(Bu_4N)_8[(COD)Ir.P_2W_{15}Nb_3O_{62}]$ and $Bu_4NBF_4$, and treating $(Bu_4N)_8[(COD)Ir.P_2W_{15}Nb_3O_{62}]$ with acetone at 40 psig $H_2$ at 25° C. for less than one hour to obtain the activated catalyst complex $(Bu_4N)_8[L'_nIr.P_2W_{15}Nb_3O_{62}]$ and cyclooctane. The second preferred species is prepared by reacting $(Bu_4N)_7SiW_9Nb_3O_{40}$ with $[Ir(COD)(CH_3CN)_2]BF_4$ in the presence of acetonitrile to obtain $(Bu_4N)_6[(COD)Ir.SiW_9Nb_3O_{40}]$ and $Bu_4NBF_4$, and treating $(Bu_4N)_6[(COD)Ir.SiW_9Nb_3O_{40}]$ with acetone at 40 psig $H_2$ at 25° C. for one-half hour to obtain the activated catalyst complex $(Bu_4N)_6[L'_nIr.SiW_9Nb_3O_{40}]$ and cyclooctane.

BRIEF DESCRIPTION OF THE DRAWINGS

FIG. 2 is a plot of initial rate of catalytic hydrogenation of cyclohexene as a function of the ratio of $Ir:SiW_9Nb_3O_{40}^{7-}$.

DETAILED DESCRIPTION OF THE INVENTION

Figure 1A:
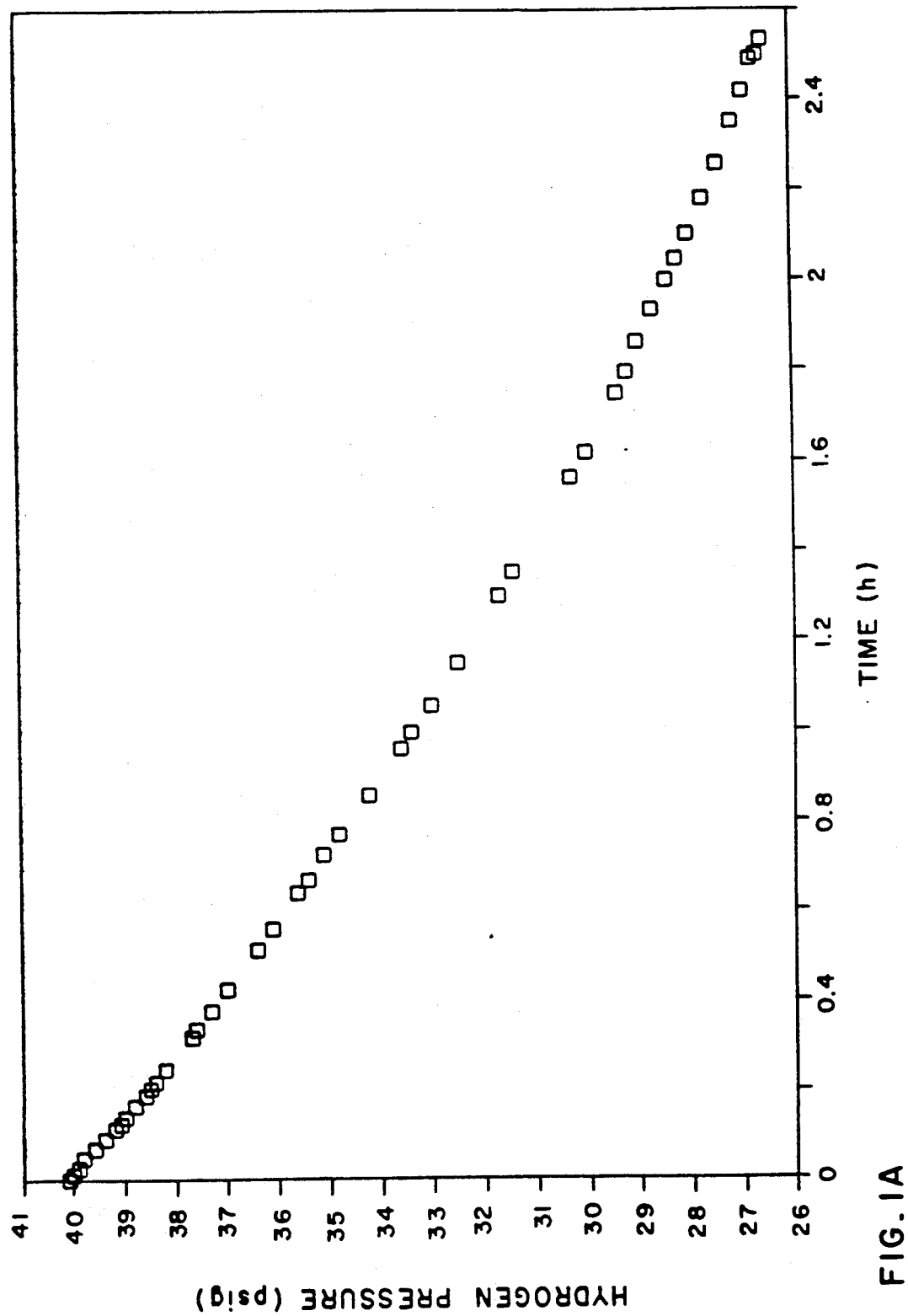
FIG. 1 comprises plots of the pressure of hydrogen versus time during cyclohexene hydrogenation.

In aqueous solutions certain metal oxides undergo stepwise hydrolysis-oligomerization reactions upon acidification according to the following representative stoichiometries ["Heteropoly and Isopoly Oxometalates" by M. T. Pope (Springer-Verlag, N.Y., 1983)]:

$$2aH^+ + bMO_n^{-r} \rightarrow [M_bO_y]^{-p} + aH_2O \qquad (1)$$

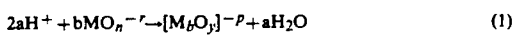

where
bn = y + a (oxygen atom balance)
br − 2a = p (charge balance)

$$2aH^- + bMO_n^{-r} + cXO_q^{-s} \rightarrow [X_cM_bO_y]^{-p} + aH_2O \quad (2)$$

where bn + cq = y + a (oxygen atom balance)

br + cs − 2a = p (charge balance) and where M can be one of several metals, e.g., W, Mo, V, or mixtures of these metals. X is usually P or Si but can be a number of other elements. The condensed metal oxides, e.g., $[X_cM_bO_y]^{-p}$, form a symmetric three dimensional array whose structure, composition, and properties can vary a great deal with various X's and M's. Which structure is present depends on the acidity of the solution, the initial amounts of $MO_n^{-r}$ and $XO_q^{-s}$, and other reaction conditions. In some cases, even under the same reaction conditions, different structures may be present. Products formed by reaction (1) are called isopolyoxoanions. Products formed by reaction (2) contain a "hetero" atom X, usually centrally located in the structure, and as a result theses products are referred to as heteropolyoxoanions.

Catalysis via polyoxoanion supported (covalently bonded) transition metals has heretofore gone largely unrecognized despite the potential such compounds represent in terms of a new class of atomically dispersed oxide-supported catalysts. It is important here to appreciate the distinction between transition metals supported on a polyoxoanion, as opposed to a metal incorporated into a polyoxoanion. By polyoxoanion supported metals we mean species that are firmly attached to a K3-O site of surface oxygens of a polyoxoanion analogous to the envisioned situation of at least some-oxide supported heterogeneous catalysts. This situation is quite different from the more common one of metals or organometallics incorporated into a vacancy in the polyoxoanion framework by four, approximately square-planar oxide ligands, e.g., $CpTi^{-3}$ incorporated into $PW_{11}O_{39}^{7-}$ or $Mo_5O_{18}^{6-}$ as $PW_{11}O_{39}(CpTi)^{4-}$ and $Mo_5O_{18}(CpTi)^{3-}$, respectively, or the incorporated $Nb^{+5}$ in $NbW_5O_{19}^{3-}$, $Nb_2W_4O_{19}^{4-}$, or $SiW_9Nb_3O_{40}^{7-}$. Metals supported on a polyoxoanion surface (but not incorporated metals) can have cis-coordination sites, greater coordinative unsaturation, and perhaps mobility on the oxide surface, all leading to reactions and mechanisms unavailable to incorporated metals and thus to distinctive catalytic chemistries. Also worth distinguishing here are organometallics bound by a single, labile bridging oxygen, cases where the polyoxoanion behaves like a simple alkoxide, RO—, e.g., $RO-U(Cp)_3-OR$ ($OR=-OMW_5O_{19}^{3-}$; $M=Ta^{5+}$, $Nb^{5+})_3$ rather than as a tight binding, K3—O ligand or support.

Two key experimental tests of a tightly and covalently polyoxoanion supported metal cation are: 1) whether the metal will be reduced to $M^{(0)}$ under $H_2$; and 2) whether a cation exchange resin will remove the metal from contact with the polyoxoanion. By these tests the $Ir^{(1)}.[SiW_9Nb_3O_{40}]^{7-}$ or $P_2W_{15}Nb_3O_{62}^{9-}]$ disclosed herein is covalently bonded, while $RhCl(PPh_3)_3 + SiW_{12}O_{40}^{4-}$ or $SiMo_{12}O_{40}^{4-}$ is clearly not covalently bonded.

For purposes of brevity in the specification, the first novel preferred species of the present invention, $X+8[L'_nIr.P_2W_{15}Nb_3O_{62}]^{-8}$ will hereinafter be referred to as the iridium mixed phosphotungstate complex. The second preferred species, $Y+6[L'_nIr.SiW_9Nb_3O_{40}]^{-6}$, will be hereinafter referred to as the iridium mixed silicotungstate complex.

The novel compounds which constitute the present invention are polyoxoanion supported metal complexes. At the time of filing this application, only the composition of the catalyst precursor is reasonably well characterized. The actual species which are present in situ during olefin hydrogenation has not been precisely determined.

As is well known in the art, heteropolyanions can be characterized as either Dawson or Keggin structures. The first genus of the precursors of the present invention is a Dawson structure polyoxoanion represented by the following formula:

$$[L_nIr.^{(1)}.X_2M_{15}M'_3O_{62}]^{x-} \quad (3)$$

The second genus is represented by the Keggin structure whose formula is as follows:

$$[L_nIr.^{(1)}.XM_9M'_3O_{40}]^{y-}, \quad (4)$$

For each of these formula, L is an olefinic ligand, preferably chosen from the group consisting of 1,5-cyclooctadiene (COD), cyclooctene, norbornodiene and ethylene; n is 1 or 2, depending upon the number of available electron pairs within the ligand. X is the "hetero" atom chosen from the group consisting of B, Si, Ge, P, As, Se, Te, I, Co, Mn and Cu. M is W or Mo. M' is preferably Nb or V, but may also be chosen from the group consisting of Ti, Zr, Ta or Hf. The ionic charge of the composition, x and y, is easily calculated by one of ordinary skill in the art, once the various atoms in the molecule are known.

The countercation for the polyoxoanion supported metal complex is chosen from two broad categories of cations. One preferred countercation is tetrabutyl ammonium. The second group of countercations consists of alkali metals chosen from the group consisting of $Na^+$, $K^+$, $Rb^+$, and $Cs^+$. Other cations are possible, including di- or higher valency cations.

The novel compositions of the instant invention have demonstrated specific utility in the catalytic hydrogenation of olefins in the liquid phase.

A. SYNTHESES OF THE IRIDIUM MIXED POLYOXOANION COMPLEXES $(Bu_4N)_7SiW_9Nb_3O_{40}$ is described in Finke, R. G.; Droge, M. W.; J. Am. Chem. Soc., 1984, 106, 7274.

EXAMPLE 1

$K_7HNb_6O_{19}.H_2O$

This isopolyniobate was obtained in a modification of literature procedures by fusing 10 g $Nb_2O_5$ in about 20 g solid KOH by heating with a bunsen burner in a nickel crucible until a molten liquid formed. After cooling, the solid was broken out of the crucible, carefully dissolved in about 200 ml distilled $H_2O$, and filtered to remove some fine, insoluble material. The product was precipitated with an equal volume of 95% enthanol and vigorous hand stirring using a glass rod. The white solid which formed was collected and washed with 95% ethanol. The solid was redissolved in $H_2O$, reprecipitated with 95% ethanol, and collected twice more. After drying at 60° C., the yield was 16 g (94%).

A-β-$Na_9HSiW_9O_{34}.23 H_2O$

This trivacant heteropolytungstate was prepared by a modified literature procedure. 60 g of $Na_2SiO_3.9 H_2O$ was dissolved in 400 ml distilled $H_2O$. 362 g of $Na_2WO_4.2H_2O$ was then added and the solution was stirred until homogeneous. 200 ml 6M HCl was slowly added to the vigorously stirring solution. The gelatinous precipitate which formed during acid addition was removed by filtration and the clear filtrate was allowed to crystallize at 5° C. for several days. Following collection and air drying, variable yields of the white crystalline solid were obtained (50-80 g, 14 to 23%).

$[Bu_4N]_6H_2Si_2W_{18}Nb_6O_{77}$ 24.0 g of $K_7HNb_6O_{19}\cdot13$ $H_2O$ (17.5 mmole) was dissolved in 3L of a 0.5M $H_2O_2$ solution. Addition of 41 ml 6 M HCl (246 mmole) turned the pale yellow solution to bright yellow. 100.0 g A-$\beta$-$Na_9HSiW_9O_3\cdot23$ $H_2O$ (35.1 mmole) was added to the stirring yellow solution resulting in gas evolution and a color change from yellow to orange. After the $SiW_9O_{34}^{10-}$ dissolved, all peroxides were destroyed by the careful addition of 200.0g $NaHSO_3$ (1922 mmoles, excess). (CAUTION! Do the previous step in a well-ventilated hood.) The solution became colorless and was vigorously stirred for 2 hours. The product was precipitated as the tetra-n-butylammonium ($Bu_4N^+$) salt by the addition of 50.0 g solid $Bu_4NBr$ (155 mmoles). The product was collected, washed with distilled water (0.75-1 L), 95% ethanol (0.75-1 L), diethyl ether (0.75-1 L), and dried overnight at 60° C.

The solid was then dissolved in 700 ml boiling $CH_3CN$. The cloudy solution was filtered hot through a pad of Celite Analytical Filter Aid. (Any cloudiness that persisted or formed after filtration was removed by the following acidification step.) 6 M HCl was added in small portions (5-10 ml) to the stirring $CH_3CN$ solution. Any remaining cloudiness was immediately removed on initial acid addition and a clear solution resulted. After about 200 ml of added acid, the solution became cloudy. The stirring rate was increased and a white crystalline solid separates. An additional 100 ml of the acid was added to ensure complete precipitation. The product was collected, washed with distilled water and dried under aspiration. This was followed by washings with 95% ethanol and diethyl ether, largely to dry the material on the frit and facilitate further manipulations. Both the filtrate and the washings were saved, combined and reduced in volume to recover any uncollected product. The products were combined and dried at 60° C. to a constant weight of 112 g $(Bu_4N)_6H_2Si_2W_{18}Nb_6O_{77}$ (97%) obtained as a white powder in two to three crops.

The product was dissolved in 1 L boiling $CH_3CN$ by reducing the solution volume to about 400 ml and cooling at 5° C. overnight. The product was collected, washed with cold $CH_3CN$, and dried at 60° C. Recovery was 81 g in two crops, for a 72% recovery and a 70% overall yield (116 g expected). Analysis Calculated for $[C_{96}H_{218}N_6Si_2W_{18}Nb_6O_{77}]$: C, 17.44; H, 3.32; N, 1.27; Si, 0.85; W, 50.05; Nb, 8.43. Found: C, 17.40; H, 3.41; N, 1.33; Si, 0.85; W, 50.50; Nb, 8.15.

The $[(n-C_4H_9)_4N]_7HSi_2W_{18}Nb_6O_{77}$ salt was obtained by crystallization of the crude product (before acidification) from a concentrated $CH_3CN$ solution. Isolated yields were typically 30-50%. Ana. Calcd for $[C_{112}H_{253}N_7]$: C, 19.63; H, 3.71; N, 1.43. Found: C, 19.66; H, 3.74; N, 1.44. The anion can be reliably identified by its characteristic $^{183}W$ NMR spectrum.

The $^{183}W$ NMR sample was prepared by dissolving 2.0 g of $(Bu_4N)_6H_2Si_2W_{18}Nb_6O_{77}$ with 3 ml $CD_3CN$ followed by addition of base (i.e., alkylamine, pyridine, water).

All IR spectra were recorded referenced to the $CD_2HCN$ solvent.

$(Bu_4N)_6H_2Si_2W_{18}Nb_6O_{77}$ (0.250 g) was dissolved in 10.0 ml $CH_3CN$. First, eight equivalents of tri-n-butylamine (0.072 ml) was added by syringe and the solution was refluxed for 30 minutes. After cooling, a small aliquot was used to record the infrared absorption spectrum (no change in 690 $cm^{-1}$ band) Next, 72 equivalents tri-b-butylamine (0.648 ml; for a total of 80 eq) was added with the reflux and IR steps 35 repeated (no change in 690 $cm^{-1}$ band). Finally, 80 equivalents $H_2O$ (0.040 ml) was added repeating the reflux and IR steps (80% loss of 690 $cm^{-1}$ band).

$(Bu_4N)_6H_2Si_2W_{18}Nb_6O_{77}$ (0.250 g) was dissolved in 10.0 ml $CH_3CN$. Eight equivalents n-butylamine (0.030 ml) was added by syringe and the solution was refluxed for 30 minutes. A small aliquot was used to record the infrared absorption spectrum (50% loss of 690 $cm^{-1}$ band). An additional 6 equivalents of n-butylamine (0.022 ml; for a total of 14 eq) was added and the solution was allowed to stand overnight at the ambient glove box temperature (25°-30° C.). The infrared spectrum was then recorded (complete loss of 690 $cm^{-1}$ band)

$[(n-C_4H_9)_4N]_7SiW_9Nb_3O_{40}$

In a typical reaction, 1.5000 g of $(Bu_4N)_6H_2Si_2W_{18}Nb_6O_{77}$ (0.23 mmole) was dissolved in about 20 ml $CH_3CN$. 8.0 equivalents of a $[(n-C_4H_9)_4NOH]$ solution (40% in water) which had been previously titrated with standard HCl to a methyl red endpoint was added by syringe. In this case, 1.11 ml (1.81 mmole) of 40% $Bu_4NOH/H_2O$ at 1.63 M were required. The solvent was removed by rotary evaporation at 80° C. under vacuum for 2-3 hours.

EXAMPLE 2

$Na_{12}P_2W_{15}O_{56}\cdot19$ $H_2O$ $Na_{12}P_2W_{15}O_{56}\cdot H_2O$ (previously formulated as "$Na_{12}P_2W_{16}O_{58}$") was prepared according to the following slightly modified literature procedure. Sodium perchlorate (107 g) was added to an aqueous solution of pure $\alpha$-$K_6P_2W_8O_{62}\cdot15$ $H_2O$ (75 g in 250 ml water) and was stirred for 2 hrs. The insoluble $KClO_4$ was removed by filtration and 1 M $Na_2CO_3$ was added to reach pH 9 (roughly 200 ml) which was maintained by base addition as required for 1 hr. with constant stirring The original light yellow solution turned colorless and then a white precipitate was formed which was collected on a coarse frit and washed with successive portions of 75 ml saturated NaCl solution, 75 ml 95% ethanol, and 75 ml diethyl ether. The product was then dried overnight at 60° C. TGA (thermal gravimetric analysis) indicated 19 waters of hydration. Yield: 60 g (83%). Drying can also be accomplished by a dessicator over concentrated $H_2SO_4$ for two days to yield a .18 $H_2O$ hydrate (by TGA). Drying over concentrated $H_2SO_4$ for longer periods of time results in a hydroscopic product. (Note that a report of crystalline $Na_{12}P_2W_{15}O_{56}\cdot x$ $H_2O$ has not appeared and the present literature synthesis probably produces impure material. Purification via recrystallization is possible at the next step, however, vide infra.).

$(Me_4N)_{12}H_4P_4W_{30}Nb_6O_{123}\cdot16$ $H_2O$

A pale yellow solution of 2.95 g $K_7HNb_6O_{19}\cdot19$ $H_2O$ (2.15 mmole) dissolved in 325 ml 0.5 $H_2O_2$ was prepared. Next, 29 ml of 1 M HCl was added followed by 18.25 g $Na_{12}P_2W_{15}O_{56}\cdot19$ $H_2O$ (4.22 mmole). After complete dissolution of the $Na_{12}P_2W_{15}O_{56}$, $NaHSO_3$ (25 g) was added resulting in a clear, colorless solution.

The resulting solution was stirred 5 minutes before addition of a large excess ($\approx$ 10 g) of tetramethylammonium chloride. The white precipitate was collected, recrystallized twice from hot, unbuffered, pH 4.6 water and dried under vacuum (0.1-0.3 torr) overnight at 25° C. Yield: 15.4 g (75%). Several TGA's done on samples prepared throughout the course of these studies show an average of 16±6 waters of hydration. Analysis for $C_{48}H_{148}N_{12}P_4W_{30}Nb_6O_{123}.16\ H_2O$: Calc: C, 6.15%; H, 1.61%; N, 1.79%; P, 1.32%; Nb, 5.95%; W, 58.90%. Found: C, 6.65%; H, 1.97%; N, 1.86%; P, 1.03%; Nb, 5.67%; W, 59.29%; K, 0%; Na, 0%.

This procedure has been successfully completed more than a dozen times by as many as four different people with satisfactory results each time.

$(Bu_4N)_{12}H_4P_4W_{30}Nb_6O_{123}$ $(Me_4N)_{12}H_4P_4W_{30}Nb_6O_{123}.16\ H_2O$ (15 g, 1.60 mmole) was dissolved in hot, pH 4.6 water (500 ml) and filtered over Celite Analytical Filter Aid (when necessary) to obtain a clear solution. The solution was then allowed to cool to room temperature. Addition of aqueous tetrabutylammonium bromide (7 g in 20 ml water) resulted in a rise in pH to 5.8 along with the formation of a white precipitate of the product. The precipitate was collected, washed well with water (to remove excess tetrabutylammonium bromide) and dried at 60° C. for 12 hrs. to yield 17.7 g (100%). Material dried in this fashion generally showed ≤0.5 $H_2O$ by TGA, consistent with the general findings of others. Analysis for the dimer $C_{192}H_{436}N_{12}P_4W_{30}Nb_6O_{123}$: Calc.: C, 20.78%; H, 3.98%; N, 1.51%; P, 1.12%; Nb, 5.02%; W, 49.71%. Found (analysis by Galbriath Laboratories): C, 20.50%; H, 3.95%; N, 1.50%; P, 0.99%; Nb, 5.16%; W, 49.96%.

Attempts to recrystallize this product were unsuccessful and reprecipitation from a saturated acetone solution to which a few drops of neutral water had been added, followed by cooling at 5° C. for a few days, provided a fine powder. After drying at 60° C. for 12 hrs. this powder was found to be less pure by elemental analysis than the original material. Analysis for the dimer $C_{192}H_{436}N_{12}P_4W_{30}Nb_6O_{123}$: Calc.: C, 20.78%; H, 3.98%; N, 1.51%; P, 1.12%; Nb, 5.02%; W, 49.71%. Found: C, 19.84%; H, 3.91%; N, 1.50%; P, 1.13%; Nb, 4.66%; W, 50.03%.

Recrystallization/reprecipitation was also attempted from acetone/pH 2 water but this yielded decomposition to $P_2W_{18}O_{62}{}^{6-}$ ($^{31}P$ NMR in $CH_3CN$; $\delta = -12.7$, $\alpha$ isomer, and $\delta = -11.0$ and $-11.6$, $\beta$ isomer). Minimizing the number of manipulations gave the best, analytically pure material, so that the initial, well-washed and dried product was chosen for subsequent experiments.

$(Bu_4N)_9P_2W_{15}Nb_3O_{62}$

A 3.00 g sample of the dimer $(Bu_4N)_{12}H_4P_4W_{30}Nb_6O_{123}$ (0.271 mmole) was dissolved in 10 ml acetonitrile. To this solution was added 3.0 equivalents per monomer (1.03 ml) of aqueous $Bu_4NOH$ (40% by weight, 1.57 molar) and stirred at room temperature for 0.5 hrs. Solid $(Bu_4N)_9P_2W_{15}Nb_3O_{62}$ was obtained by removal of the solvent under vacuum at 25° C. for 24 hrs. We have been unable to crystallize $(Bu_4N)_9P_2W_{15}Nb_3O_{62}$ to date, presumably due to the inability of the preferred lattice to accommodate more than six $Bu_4N^+$ cations. However, a crystalline product can be obtained if the $DBU.H^+$ (DBU=1,8-diazabicyclo[5.4.0.]undec-7-ene) salt is prepared as described below. Purity of the non-crystalline $(Bu_4N)_9P_2W_{15}Nb_3O_{62}$ was ascertained by $^{31}P$ NMR. All $(Bu_4N)_9P_2W_{15}Nb_3O_{62}$ used in this work exhibited a $^{31}P$ NMR consisting predominantly of the anticipated two lines ($\delta = -7.3$ and $-14.1 \pm 0.2$ ppm) and two less intense signals at $\delta = -9.1$ and $-13.8 \pm 0.2$ ppm (both of <5% relative intensity). These latter two lines are not present in material that has been placed in a 60° C. oven for 24 hrs. TGA failed to show any solvates in material dried either under vacuum or at 60° C. for 24 hrs.

Experience has shown that $(Bu_4N)_9P_2W_{15}Nb_3O_{62}$ has a short shelf life. Therefore, it is suggested that this material be prepared as needed and prolonged storage (greater than two weeks) be avoided.

$(DBU.19\ H)_9P_2W_{15}Nb_3O_{62}.11\ H_2O$

To a warm ($\approx$30° C.) aqueous solution of 5.0 g (0.535 mmole) $(Me_4N)_{12}H_4P_4W_{30}Nb_6O_{123}.16\ H_2O$ was added, with stirring an excess (2.00 g, 10.6 mmole) of DBU.HCl. Cooling to 0° C. overnight yielded a white precipitate which was collected, washed with 95% ethanol, then dried at 80° C. under 0.1-0.3 torr for 3 hrs., to yield 5.2 g. Three grams of this material were then slurried in 100 ml of refluxing $CH_3CN/DMSO$ (5:1) and about 1.5 ml DBU was added. Refluxing was continued for 17 hrs., after which time the solution had become homogeneous. The volume of the solution was condensed to 25 ml and addition of 95% ethanol resulted in precipitation of the crude product as a white powder. Crystallization was accomplished by slowly cooling a hot, saturated $CH_3CN/H_2O$ (1:1, v/v) solution at 5° C. overnight. Drying at room temperature under 0.1-0.3 torr for 3 hrs. resulted in 2.50 g (0.441 mmole), 41%. TGA was consistent with 11 waters of hydration. Analysis for $C_{81}H_{175}N_{18}P_2W_{15}Nb_3O_{73}$; Cal.: C, 17.17%; H, 3.11%; N, 4.45%; P, 1.09%; Nb, 4.92%; W, 48.66%. Found: C, 16.76%; H, 3.15%; N, 4.47%; P, 1.01%; Nb, 4.45%; W, 49.49%.

Instrumentation/Analytical Procedures. $^{31}P$ NMR spectra (146.18 MHz) were recorded on a Nicolet NT-360 spectrometer using 12 mm o.d. sample tubes and referenced, by the substitution method, to 1% $H_3PO_4$ in $D_2O$. Chemical shifts are reported in parts per million with negative values upfield of the standard.

EXAMPLE 3

Preparation of $[Ir(COD)Cl]_2$.

This compound is prepared by the literature methods from either $IrCl_3.3\ H_2O$ or $(NH_4)_2IrCl_6$. See Herde, J. L.; Lambert, J. C.; Senoff, C. V., *Inorg. Syn.*, 1974, 15, 18; Crabtree, R. H.; Quirk, J. M.; Felkin, H.; Fillebeen-Kahn, T.; *Synth. React. Inorg. Met.—Org. Chem.* 1982, 12, 407. Generally this synthesis is done on a 0.5-1.0 g scale to yield 70-91% of red to red-brown $[Ir(COD)Cl]_2$. Purity is ascertained by $^1H$ NMR. Occasionally, a batch of $IrCl_3.3\ H_2O$ is encountered which gives low (<40%) yield of $[Ir(COD)Cl]_2$. This problem can be avoided by using $(NH_4)_2IrCl_6$. The $[Ir(COD)Cl]_2$ compound is known to be $O_2$ sensitive (Alhay, M. H. et al., *Can. J. Chem.* 61:1332 (1983)) so that its exposure to air should be avoided.

EXAMPLE 4

Synthesis of $[Ir(COD)(CH_3CN)_2]BF_4$.

This modified literature synthesis (Green, M.: *J. Chem. Soc.*, (A) 1971, 2334) is best done under a nitrogen atmosphere but can be successfully accomplished under air if solutions containing the solvate are vigorously purged with nitrogen and exposure to air (oxygen) kept to an absolute minimum. A typical preparation is as follows: To 10 ml of acetonitrile (degassed by purging with $N_2$ for 15 min) was added 0.10643 g (0.159 mmol) [Ir(COD)Cl]$_2$. To this mixture was added 0.06270 g (0.322 mmol, 2.0 equivalents) AgBF$_4$ and the mixture stirred for 30 min. The white AgCl precipitate was removed by filtration over Celite to yield a clear yellow to yellow/orange filtrate Best results are obtained when the filtrate is used directly rather than isolating the [Ir(COD)(CH$_3$CN)$_2$]BF$_4$ product, however a yellow precipitate of [Ir(COD)(CH$_3$CN)$_2$]BF$_4$ can be obtained by slowly adding the acetonitrile solution to diethyl ether (although oiling is occasionally a problem). Filtration over a medium frit is followed by washing with Et$_2$O and drying under high vacuum at room temperature for 12-18 h. Purity of the solvate was determined by $^1$H NMR. The corresponding NO$_3^-$, PF$_6^-$, and ClO$_4^-$ salts are similarly prepared from [Ir(COD)Cl]$_2$ and the appropriate silver salt.

EXAMPLE 5

The Iridium Mixed Silicotungstate Complex: (Bu$_4$N)$_6$[(COD)Ir.SiW$_9$Nb$_3$O$_{40}$].Bu$_4$NBF$_4$.6 H$_2$O.0.5CH$_3$CN.

This synthesis is best performed under an N$_2$ atmosphere, but can be successfully accomplished under air if solutions containing [Ir(COD)(CH$_3$CN)$_2$]$^-$ are vigorously purged with N$_2$ and exposure to air is minimized. An acetonitrile solution of 1-2 g of (Bu$_4$N)$_7$SiW$_9$Nb$_3$O$_{40}$ (see Example 1) is added to a nitrogen purged, acetonitrile solution of 1 eq [Ir(COD)(CH$_3$CN)$_2$]BF$_4$ (this synthesis works equally well when [Ir(COD)(CH$_3$CN)$_3$]$^+$X$^-$, X$^-$ = NO$_3^-$, PF$_6^-$, or ClO$_4^-$, is used instead of [Ir(COD)(CH$_3$CN)$_2$]BF$_4$) followed by removal of the solvents under vacuum. The product is amorphous and all attempts to recrystallize it have failed due to the large number of Bu$_4$N$^+$ cations (Finke, R. G.; Rapko, B.; Saxton, R. J.; Domaille, P. J.; *J. Am. Chem. Soc.* 1986, 108, 2947). Consequently, the iridium mixed silicotungstate complex contains 1 eq of Bu$_4$NBF$_4$. Control experiments in which a large excess (400 eq) of Bu$_4$NBF$_4$ were added to the iridium mixed silicotungstate complex indicate that this byproduct has no effect on the rate of cyclohexene hydrogenation catalyzed by the iridium mixed silicotungstate complex.

The number of solvates, determined by TGA, is consistent with 6 H$_2$O and 0.5 CH$_3$CN: calculated 2.67% solvent loss for 6 H$_2$O and 0.5 CH$_3$CN; found 2.55% weight loss. The presence of 0.5±0.35 eq CH$_3$CN was confirmed by GLC. Elemental analysis of the iridium mixed silicotungstate complex: calculated values for the 6H$_2$O, 0.5 CH$_3$CN solvate C$_{121}$H$_{277.5}$N$_{7.5}$IrSiW$_9$Nb$_3$O$_{46}$.BF$_4$: C, 30.18; H, 5.81; N, 2.18; W, 34.37; Ir, 3.99; Si, 0.59%; Nb, 5.79. Found: C, 30.07%; H, 5.70; N, 2.54; W, 34.40; Ir, 4.38; Si, 0.93; Nb, 6.61.

The IR spectrum (CH$_3$CN) of the iridium mixed silicotungstate complex shows the characteristic absorbances of a Keggin type heteropolyanion: 1104 (w), 994 (m), 952 (m), 888 (s), 804 (s), 784 (s, sh).

The intratriad M-0-M stretching band (nominally 800 cm$^-$ is split (804 and 784 cm$^{-1}$) indicating a bonding interaction between iridium and the polyoxoanion. This splitting phenomenon has been documented for many polyoxoanion-supported organometallic complexes. See, e.g., Finke, R. G.; Rapko, B; Domaille, P. J.; Organometallics 1986, 5, 175.

The presence of 1.0 eq COD was confirmed by detection of 1.0±0.1 eg cyclooctane (by glc) after reaction of the iridium mixed silicotungstate complex with hydrogen. $^1$H and $^{13}$C NMR of a 0.02 M solution of the iridium mixed silicotungstate complex in either d$_6$-Me$_2$SO or CD$_3$CN failed to reveal the expected resonances which could be attributed to coordinated or free COD.

EXAMPLE 6

An Alternate Preparation of the Precatalyst [(Bu$_4$N)$_6$(COD)Ir.SiW$_9$Nb$_3$O$_{40}$].Bu$_4$NClO$_4$,1.

Into an 18×120 mm t®st tube is placed 89.68 mg (0.133 mmol) [Ir(COD)Cl]$_2$ and 50.16 mg (0.242 mmol)—not quite 2.0 equivalents to avoid the presence of Ag$^+$ in the product—AgClO$_4$. Fifteen ml degassed (by N$_2$ purge for 15 min) CH$_3$CN is added, followed by a N$_2$ purge for 30 min. After this time the yellow solution is filtered through Celite to remove the AgCl ppt. The Celite pad is washed three 1 ml portions of degassed (by N$_2$ purge) CH$_3$CN. A separate solution of 1.04 mg (0.242 mmol) (Bu$_4$N)$_7$SiW$_9$Nb$_3$O$_{40}$ in 10 ml CH$_3$CN and 5 ml H$_2$O (which had been previously prepared and purged for 15 min with N$_2$) is drawn through the Celite pad and into the yellow filtrate containing [Ir(COD)(CH$_3$CN)$_2$]ClO$_4$ while continually stirring the solution to ensure adequate mixing. The Celite pad is again washed with three portions of CH$_3$CN (about 5 ml total, does not have to be degassed) and then the combined filtrate and washings are placed in a 50 ml round bottom flask and reduced in volume (by rotovaporation) to about 8 ml. At this point the solvent present is mostly water; the orange-brown [(Bu$_4$N)$_6$(COD)Ir.SiW$_9$Nb$_3$O$_{40}$] oils out and foaming becomes a problem. The flask and contents are removed from the rotovaporator and 25 ml, 1,2-dichloroethane is added. The orange-brown oil readily dissolves in the 1,2-dichloroethane. The layers are separated and the aqueous fraction discarded while the 1,2-dichloroethane is removed under vacuum (0.1-0.3 torr, room temperature) to yield the product as an amorphous orange-brown solid.

It was hoped that the Bu$_4$NClO$_4$ would not be extracted into the 1,2-dichloroethane, but this proved not to be true. Attempted fractional precipitation of Bu$_4$NC$_{10}$4 from CH$_3$CN/H$_2$O, EtOH/CH$_3$CN, and CHCl$_3$/CH$_3$CN solvent mixtures also failed to yield the desired separation.

The sample is dried under high vacuum (0.1 torr) at 80° C. for 12 h. Dried in this manner, the product is hygroscopic.

No solvates are detected by TGA. Elemental analysis of 1: calculated for C$_{120}$H$_{264}$N$_7$IrSiW$_9$Nb$_3$O$_{40}$.ClO$_4$: C., 30.66; H, 5.66; N, 2.09; W, 35.21; Nb, 5.93; Ir, 4.09; Si, 0.60. Found: C, 30.31; H, 5.59; N, 2.10; W, 35.35; Nb, 5.83; Ir, 4.16; Si, 0.76.

EXAMPLE 7

The Iridium Mixed Phosphotungstate Complex: (Bu$_4$N)$_8$[(COD)Ir.P$_2$W15Nb$_3$O$_{62}$].Bu$_4$NBF$_4$.9 H$_2$O.

Typically, a degassed acetonitrile solution of 1-2 g (Bu$_4$N)$_9$P$_2$W$_{15}$Nb$_3$O$_{62}$ is added to a degassed acetonitrile solution of 1 eq [Ir(COD)(CH$_3$CN)$_2$]BF$_4$ (see Example 4 above) followed by removal of the solvents under vacuum to yield an amorphous solid. The yield is quantitative and attempts to recrystallize the iridium mixed phosphotungstate complex have failed. Thus, the iridium mixed phosphotungstate complex contains 1 eq of Bu$_4$NBF$_4$. However, it was determined that this impurity has no effect on the rate of catalytic hydrogenations since addition of 400 eq Bu$_4$NBF$_4$ to the iridium mixed phosphotungstate complex as well as Bu$_4$NBF$_4$-free iridium mixed phosphotungstate complex (See Example 8, prepared from [Ir(COD)(CH$_3$CN)$_2$]ClO$_4$ and removal of the insoluble Bu$_4$NClO$_4$) yield experimentally similar hydrogenation rates. No CH$_3$CN was detected by GLC. The number of solvates, determined by TGA, is consistent with 9 H$_2$O: calculated 2.38% weight loss for 9 H$_2$O; found 2.40% weight loss. Elemental analysis of the iridium mixed phosphotungstate complex: calculated for the 9 H$_2$O solvate C$_{152}$H$_{354}$N$_9$IrP$_2$W$_{15}$Nb$_3$O$_{71}$·BF$_4$: C, 26.76; H, 5.23; N, 1.85; W, 40.43; Nb, 4.09; Ir, 2.82; P, 0.91. Found: C, 26.52; H, 4.95; N, 2.13; W, 40.82; Nb, 3.98; Ir, 2.97; P, 0.69.

The IR spectrum (CH$_3$CN) of the iridium mixed phosphotungstate complex is typical of a Dawson type heteropolyanion: 1096 (w), 994 (m), 895 (m), 809 (s), 783 (s, sh). The intratriad M-O-M stretching band (nominally 800 cm$^{-1}$ is split (809 and 783 cm$^{-1}$) indicating a bonding interaction between iridium and the polyoxoanion. This splitting phenomenon has been documented for many polyoxoanion-supported organometallic complexes.

The presence of 1.0 eq COD was confirmed by detection of 1.0 eq cyclooctane (by GLC) after reaction of the iridium mixed phosphotungstate complex with hydrogen. Displacement of the coordinated COD in the iridium mixed phosphotungstate complex by excess NBD (free COD measured by $^1$H NMR) confirmed this result even though coordinated COD could not be detected by either $^1$H or $^{13}$C NMR of a 0.02 M CD$_3$CN solution of the iridium mixed phosphotungstate complex.

EXAMPLE 8

[Bu$_4$N]$_8$(COD)Ir.P$_2$W$_{15}$Nb$_3$O$_{62}$]$_n$, 2.

Into 10 ml of acetonitrile is added 106.53 mg (0.158 mmol) [Ir(COD)Cl]$_2$ and the mixture degassed by application of a N$_2$ purge for 15 min. To this slurry is added 68.06 mg (0.328 mmol) AgClO$_4$. A white precipitate forms immediately and the solution color changes from orange to yellow. The N$_2$ purge is continued for another 15 min. After this time, the yellow solution is filtered through Celite to remove the AgCl ppt. The Celite pad is washed three 1 ml portions of degassed (by N$_2$ purge) CH$_3$CN. A separate solution of 505.29 mg (0.080 mmol) (BU4N)$_9$P$_2$W$_{15}$Nb$_3$O$_{62}$ in 10 ml CH$_3$CN and 5 ml H$_2$O (which had been previously prepared and purged for 5 min with N$_2$) is drawn through the Celite pad and into the yellow filtrate containing [Ir(COD)(CH$_3$CN)ClO$_4$ while continually stirring the solution to ensure adequate mixing. During this addition the color of the solution changes from yellow to amber. The Celite pad is again washed with three portions of CH$_3$CN (about 5 ml total, does not have to be degassed) and then the combined filtrate and washings are placed in a 50 ml round bottom flask and reduced in volume (by rotovaporation) to about 5 ml. Three ml of a 1:1 EtOH/H$_2$O solution is added, followed by cooling to 0° C., resulting in a small amount of white precipitate which is separated from the amber mother liquor by centrifugation or filtration through Celite. The mother liquor is rotovapped to dryness, then dried at 80° C. under high vacuum (0.1 torr) for 12 hrs. Dried in this fashion, the product is hygroscopic.

The extraction procedure described above for separation of Bu$_4$NClO$_4$ from 1 does not work well in this case (an emulsion readily forms). No solvates are detected by TGA. Elemental analysis of 2: calculated for 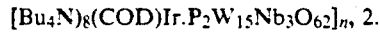C$_{136}$H$_{300}$N$_5$IrP$_2$W$_{15}$Nb$_3$O$_{62}$:° C., 25.80; H, 4.78; N, 1.77; W, 43.56; Nb, 4.40; Ir, 3.04; P, 0.98. Found: C, 25.85; H, 5.04; N, 1.95; W, 43.35; Nb, 4.20; Ir, 2.71; p, 0.63.

EXAMPLE 9

Synthesis of [IrH$_2$(acetone)$_2$(PPh$_3$)$_2$]BF$_4$.

This catalyst is prepared (Crabtree, R. H.; Mellea, M. F.; Mihelcic, J. M.; Quirk, J. M., *J. Am. Chem. Soc.*, 1982, 104, 107) by the action of hydrogen on a cold, acetone solution of [Ir(COD)(PPh$_3$)$_2$]PF$_6$. (Haines, L. M.; Singleton, E., *J. Chem. Soc.*, Dalton Trans. 1972, 1891.) Since the reduction of coordinated COD occurs almost immediately, identical hydrogenation activity is obtained by using the precursor directly. This compound is synthesized and used herein to enable comparison of the catalytic hydrogenation activity of the claimed novel compounds versus the well characterized Crabtree's catalyst.

EXAMPLE 10

(Ir$^{(0)}$)$_n$, Precipitated Iridium$^{(0)}$).

An acetone solution of either [Ir(COD)(CH$_3$CN)$_2$]BF$_4$ or the iridium mixed silicotungstate complex (0.001-0.01M) is placed under 40 psig H$_2$ with rapid stirring. At room temperature ($\approx$22° C.) the reduction of [Ir(COD)(CH$_3$CN)$_2$]+ occurs immediately, while reduction of the iridium mixed silicotungstate complex occurs more slowly, requiring >0.5 h to go to completion. For this reason, reductions of the iridium mixed silicotungstate to are allowed to proceed under 40 psig H$_2$ for 2-3 h. The (IR$^{(0)}$)$_n$ was either used in situ or collected by centrifugation followed by washing with acetone 3 times before drying under high vacuum at room temperature for 18 hours. Yields were 83% and 73% for, respectively, (Ir$^{(0)}$)$_n$ obtained from [Ir(COD)(CH$_3$CN)$_2$]BF$_4$ and the iridium mixed silicotungstate complex. In the case of (Ir$^{(0)}$)$_n$ prepared from the iridium mixed silicotungstate complex, the mother liquor is black yet transparent to light. However, the black solution was tested for catalytic hydrogenation activity and found to be completely inactive. These results indicate that, under these conditions, the iridium colloid that forms is unlikely to be catalytically active. Evaporation of the solvent yields a brown-black product which analyzes for 79% Ir.

EXAMPLE 11

Synthesis of the Carbonyl Iridium Mixed Silicotungstate Complex [(OC)$_2$Ir.SiW$_9$Nb$_3$O$_{40}$]$^{6-}$, and the Carbonyl Iridium Mixed Phosphotungstate Complex [(OC)$_2$Ir.P$_2$W$_{15}$Nb$_3$O$_{62}$]$^{8-}$.

These complexes are prepared at room temperature by subjecting an acetone solution of either the iridium mixed silicotungstate complex or the iridium mixed phosphotungstate complex to 40 psig CO for 15-30 min. The IR spectrum of the carbonyl iridium mixed silicotungstate complex shows two strong absorbances ($v_{CO}$=2050 cm$^{-1}$ and 1975 cm$^{-1}$). Similarly, the IR spectrum of the carbonyl iridium mixed phosphotungstate also exhibits two absorbances ($\mu_{CO}$=2060 cm$^{-1}$ and 1980 cm$^{-1}$). The assignment of these IR bands of carbonyl vibrations was confirmed by the shift to lower energy when 13CO was used to prepare both dicarbonyls ($v$CO=2000 cm$^{-1}$, 1930 cm$^{-1}$ and 2015 cm$^{-1}$, 1935 cm$^{-1}$, respectively). In comparison, [Ir(CO)$_2$(CH$_3$CN)$_2$]BF$_4$ (prepared by treating a 3 ml acetone solution containing 200 mg [Ir(COD)(CH$_3$CN)$_2$]BF$_4$ with 40 psig CO for 15 min) also exhibits two carbonyl vibrations, one at 2110 cm$^{-1}$ and one at 2050 cm$^{-1}$.

EXAMPLE 12

Anion/Cation Exchange Resin Tests.

This test was performed on both the iridium mixed silicotungstate and the iridium mixed phosphotungstate complex to demonstrate covalent support of the (COD)Ir$^+$ moiety. A cation exchange column (7 mm×270 mm) was packed with Amberlyst A-15 resin which had been previously washed with aqueous Bu$_4$NOH until the pH of the wash solution remained strongly basic. Once packed, the column was washed with reagent grade acetonitrile. Roughly 0.1 g sample (i.e., the iridium mixed silicotungstate complex, the iridium mixed phosphotungstate complex, or [Ir(COD)(CH$_3$CN)$_2$]BF$_4$ as a control) dissolved in 1 ml of acetonitrile was placed at the top of the resin and eluted with acetonitrile at a rate of ca. 1 drop every 10 s. Analysis of the sample eluent showed that the solution passed through unchanged by the resin, while the control eluent indicated bonding of the cationic iridium.

An anion exchange column of similar proportions was packed with Amberlyst A-27 resin in the Cl$^-$ form and washed with reagent grade acetonitrile. Loading and elution were performed as described above and [Ir(COD)(CH$_3$CN)$_2$]BF$_4$ was again used as a control. Covalent bonding of the iridium to the heteropolyanion was verified by passing acetonitrile solutions of the two iridium polyoxoanion complex down the Amberlyst A-27 anion exchange column. The amber complexes (indicating the presence of the iridium polyoxoanion complexes) adhere tightly to the anion exchange resin while the control complex passes through the resin unaffected.

EXAMPLE 13

Hydrogenolysis of Coordinated COD to Yield Activated Iridium Mixed Silicotungstate Complex or Iridium Mixed Phosphotungstate Complex.

This reduction was carried out at room temperature by application of 40 psig hydrogen to a rapidly stirred acetones solution (see hydrogenations, general procedure) of either iridium mixed silicotungstate complex or iridium mixed phosphotungstate complex for 0.5-1 h. No free olefin is present in solution. The reduction is determined to be complete and the hydrogen vented, in the case of iridium mixed silicotungstate complex, when the appearance of black precipitate of (Ir$^{(0)}$)$_n$ is first observed. Since reduction of the polyoxoanion occurs with the iridium mixed phosphotungstate complex, hydrogenolysis is considered complete when the solution changes from yellow to green in color (due to formation of the heteropolyblue). Once exposed to air, the green acetone solutions of activated iridium mixed phosphotungstate complex rapidly turn back to the original yellow-amber color, indicating rapid oxidation of the heteropolyblue. In the presence of $\geqq$100 eq cyclohexene, neither the iridium mixed silicotungstate complex nor the iridium mixed phosphotungstate complex react with hydrogen (after 48 h) to yield activated iridium mixed silicotungstate complex or iridium mixed phosphotungstate complex.

Since a small amount of (Ir$^{(0)}$)$_n$ precipitate is an unavoidable byproduct, the acetone solutions are filtered over Celite filter aid, to yield clear yellow to amber colored solutions, prior to removal of the solvent under vacuum. Drying under high vacuum at room temperature for 18 h yields the amorphous products described herein as activated iridium mixed silicotungstate complex and activated iridium mixed phosphotungstate complex.

The exact composition of these catalyst precursors (such as. e.g., Examples 5, 6, 7 and 8), which are formulated L'$_n$Ir.heteropolyanion$^{-y}$ (where heteropolyanion = SiW$_9$Nb$_3$O$_{40}$$^{7-}$ or P$_2$W$_{15}$Nb$_3$O$_{62}$$^{9-}$)) is unknown with respect to ligand L'.

Additionally, the IR spectrum of activated iridium mixed silicotungstate complex exhibits the same heteropoyanion characteristic bands found in the precatalyst iridium mixed solicotungstate complex, but the splitting of the intratriad M-O-M band has increased to 22 cm$^{-1}$ in activated iridium mixed silicotungstate complex. Additionally, the M=O terminal oxygen band has shifted slightly to slightly higher energy (955 cm$^{-1}$ for activated iridium mixed silicotunqstate complex, 952 cm$^{-1}$ for iridium mixed silicotungstate complex). This result is consistent with the removal of surface electron density from the heteropolyanion upon activation of iridium mixed silicotungstate complex. The IR data suggest that controlled hydrogenolysis of iridium mixed silicotungstate complex (and by analogy iridium mixed phosphotungstate complex) leaves the Ir polyoxoanion moiety intact and slightly increases the bonding interaction between the iridium moiety and the intratriad bridging oxygens.

$^1$H NMR and IR spectra of CD3CN solutions of L'$_n$Ir.P$_2$W$_{15}$Nb$_3$O$_{62}$$^{8-}$ fail to show any resonances or absorbances which can be attributed to hydride ligands. Reaction of acetonitrile solutions of L$_x$Ir.P$_2$W$_{15}$Nb$_3$O$_{62}$$^{8-}$ or L$_x$Ir.SiW$_9$Nb$_3$O$_{40}$$^{6-}$ with CCl$_4$ does produce $\leqq$2 eq CHCl$_3$ (by GLC) but the quantity obtained is not reproducible. Other possibilities for L are coordinated acetone or acetone that has oxidatively added a C—H bond to the iridium. Such metallation of acidic C—H bonds by rhodium and iridium complexes are reported by English, A. D.; Herskovitz, J., *J. Am Chem. Soc.*, 1977, 99, 1648.

During this hydrogenolysis step, Ir$^{(1)}$ is kinetically stabilized, with respect to reduction to Ir$^{(0)}$, by heteropolyanions with surface charge density, such as, e.g., SiW$_9$Nb$_3$O$_{40}$$^{7-}$ and P$_2$W!5Nb$_3$O$_{62}$$^{9-}$. To illustrate this point, one equivalent of the very low surface charge density heteropolyanion P$_2$W$_{18}$O$_{62}$$^{6-}$ ≡ (-PO$_4$)$_2$$^{6-}$(WO$_3$)$_{18}$$^0$ was added to one equivalent of [Ir(COD)(CH$_3$CN)$_2$]BF$_4$ in acetone and the solution placed under 40 psig hydrogen. A black precipitate of (Ir$^{(0)}$)$_n$ formed within 5 minutes (Table 1, entry 3). If [Ir(COD)(CH$_3$CN)$_2$]BF$_4$ alone is treated with hydrogen, (Ir$^{(0)}$)$_n$ precipitates immediately. Thus, if the iridium mixed heteropolyoxoanion compounds can be regarded as reasonable models for oxide-supported metal catalysts (e.g., Ir/Al$_2$O$_3$) then it is expected that basic sites on the oxide play a key role in the interaction between the support and the metal.

Although no loss in catalytic activity of activated iridium mixed silicotungstate complex has been observed when stored for up to 40 days as the dry solid (longer storage results in the appearance of a small amount of CH$_3$CN insoluble material), solutions of both activated complexes as well as dry, solid activated iridium mixed phosphotungstate complex do exhibit a loss of activity upon short term storage ($\approx$2-3 h for solutions and $\approx$1-2 weeks for solid iridium mixed phosphotungstate complex). Consequently, solutions should be prepared immediately prior to use and storage of dry, solid activated iridium mixed phosphotungstate complex for periods longer than 1 should be avoided.

B. OLEFIN HYDROGENATIONS.

General Procedure. Catalytic hydrogenations of cyclohexene are done in Fischer-Porter pressure bottles equipped with high precision test gauges (either 0 to 60±0.09 psig or 0 to 100±0.15 psig). A dilute (typically 0.5mM) acetone solution (2.50 ml in volume) of the catalyst and 0.50 ml of freshly purified cyclohexene are placed in a 18×150mm borosilicate disposable test tube along with a small ($\leq 1$ cm in length) Teflon coated magnetic stir bar. The test tube is lowered into the Fischer-Porter bottle which is then capped, purged with hydrogen, and pressurized to 40 psig. The entire apparatus is clamped above a magnetic stirrer and the acetone/cyclohexene solution vigorously stirred. The reaction is monitored by recording the drop in hydrogen pressure as a function of time. At the completion of the hydrogenation, $^1$H NMR (in CDCl$_3$) is used to verify the extent of cyclohexene reduction and establish mass balance. The $^1$H NMR integrals were verified by GLC to better than ±5%.

A new borosilicate test tube is used for each hydrogenation. Stir bars are periodically checked for contamination by running a blank (stir bar, acetone, and cyclohexene) and discarded if hydrogenation of cyclohexene is detected by $^1$H NMR.

Kinetics, General Procedure. A kinetic analysis of the hydrogenation of cyclohexene catalyzed by activated iridium mixed silicotungstate complex is performed in a fashion nearly identical to the above hydrogenation procedure. The total volume of acetone and cyclohexene always equals 3.00 ml and the Fischer-Porter bottle is clamped in a thermostated water bath, held at 22° C., while the contents are stirred via a magnetic stirrer. The start of each hydrogenation is arbitrarily defined to occur after purging and pressurizing with hydrogen and commenced with immersion in the water bath. Reaction time is measured with an electronic timer with a precision of ±1 second.

Cyclohexene was measured with an appropriately sized gas tight syringe. The concentration of hydrogen is assumed to be proportional to $P_{hydrogen}$.

The initial concentration of the activated iridium mixed silicotungstate complex is calculated by assuming a molecular weight of 4700 (this assumed value closely approximates the formulation (Bu$_4$N)$_6$[L$_2$Ir.SiW$_9$Nb$_3$O$_{40}$].Bu$_4$NBF$_4$, where L=acetone). For (Ir$^{(0)}$)$_n$, the number of active iridium sites is assumed to be equal to the number of Ir atoms present, except for the one sample with a known BET surface area, and it is assumed that all accessible iridium atoms are catalytically active. The assumptions result in calculated turnover frequency values and total number of turnovers which are very probably lower than the true values. The large amount of sample (generally $\geq 0.25$ g) required for a BET surface area measurement precluded applying this technique to all samples of (Ir$^{(0)}$)$_n$ with the exception of one large batch ($\approx 0.25$ g) prepared by reducing 0.31 g [Ir(COD)(CH$_3$CN)$_2$]BF$_4$ with hydrogen. This sample gave a BET surface area of 2.57 m$^2$/g. The number of surface iridium atoms/g was calculated assuming that each Ir$^{(0)}$ atom (atomic radius of 1.36 Å) has a surface area of $5.81 \times 10^{-20}$ m$^2$.

EXAMPLE 14

Samples of low dispersion and ultradispersed Ir/Al$_2$O$_3$ were subjected to hydrogen chemisorption. The results yield 7.9 and 80%, respectively.

EXAMPLE 15

Catalyst Recovery by Reaction with CO.

This reaction was carried out by splitting a solution of activated iridium mixed silicotungstate complex in acetone/cyclohexene (2.50 ml acetone, 0.50 ml cyclohexene, 0.5mM catalyst) into two portions. One portion was placed under 40 psig CO for 15 minutes while the other portion was placed under hydrogen (40 psig), as described above, until reduction of $\approx 500$-25,000 eq cyclohexene was completed (by IH NMR). The solution was then vented and placed under 40 psig CO for 15 minutes. The IR spectrum was obtained, in the absorbance mode and using CaF$_2$ solution cells (0.1 mm pathlength) referenced to CH$_3$CN, of both solutions. Comparison of the intensity of the carbonyl bands showed 100±5% conversion of the active catalyst to the carbonyl iridium mixed silicotungstate complex. The same procedure was applied to an acetone solution of activated iridium mixed phosphotungstate complex to provide an indication of the degree of catalyst conversion to the carbonyl iridium mixed phosphotungstate complex, with the same results.

EXAMPLE 16

General Catalyst Inhibition Tests.

A 0.5 mM 5:1 (v/v) acetone/cyclohexene solution (3.00 ml in volume) of active catalyst (activated iridium mixed silicotungstate complex or activated iridium mixed phosphotungstate complex), or the equivalent number of moles of (Ir$^{(0)}$)$_n$ or low dispersion and ultradispersed Ir/-Al$_2$O$_3$, was prepared and exposed to 40 psig hydrogen, at 22° C., for a precisely measured (±1 s) period of time, not to exceed 0.5 h. $^1$H NMR provided a measure of the extent of the hydrogenation and a plot of $P$hydrogen vs. time gave an indication of the change in reaction rate as a function of time. In all cases, the change in the slope of $P$hydrogen vs. time was negligible, hence the initial turnover frequency was approximated by the average turnover frequency. Then, a given number of equivalents of the reagent in question was added to the catalyst solution and the hydrogenation rate determined again, as described above. The results are presented in Table 2. Comparison of the initial hydrogenation rate before and after addition of the reagent in question provided a measure of the reagent's effectiveness as an inhibitor.

EXAMPLE 17

Hydrogenation of Benzene, Nitrobenzene, and 2,3-Dimethyl-2-butene.

These substrates were treated in the same manner as described above in the general olefin hydrogenation procedures, by successively substituting each for cyclohexene. The results are presented in Table 2.

EXAMPLE 18

Ligand Substitution Reactivity of Iridium Mixed Phosphotungstate Complex and [Ir(COD)(CH$_3$CN)$_2$]BF$_4$.

The lability of the COD ligand in either the iridium mixed phosphotungstate complex or [Ir(COD)(CH$_3$CN)$_2$]$^+$ with respect to displacement by 2,5-norbornadiene (NBD) was investigated in room temperature acetone solution. Two, separate 1 ml solutions (0.02 M) of iridium mixed phosphotungstate complex and [Ir(COD)(CH$_3$CN)$_2$]BF$_4$ were prepared in CD$_3$CN and the $^1$H NMR obtained. Then, 0.15 ml NBD (1.4 mmol) was added to each solution and the $^1$H NMR spectrum obtained, of both solutions, at arbitrary time intervals beginning with 5 min and ending with 3 h. For the solution containing [Ir(COD)(CH$_3$CN)$_2$]BF$_4$, both coordinated and free COD could be observed. However, only free COD was observed for the solution containing iridium mixed phosphotungstate complex. A comparison of the integration intensity of the olefinic protons for free COD as a function of time provided a qualitative measure of the relative rate of ligand substitution. The data indicate a five coordinate iridium phosphotungstate complex.

EXAMPLE 19

[Ir(COD)$^+$]$_x$:[SiW$_9$Nb$_3$O$_{40}$$^{7-}$]$_y$ Ratio vs. Rate Plot.

In order to determine the optimum [Ir(COD)$^+$]$_x$:[SiW$_9$Nb$_3$O$_{40}$$^{7-}$]$_y$ ratio, a plot of catalytic activity as a function of the ratio [Ir(COD)$^+$]$_x$:[SiW$_9$Nb$_3$O$_{40}$$^{7-}$]$_y$ was constructed as follows: an acetone solution (6 ml in volume) containing 4.0 mg [Ir(COD)(CH$_3$CN)$_2$]BF$_4$ per each 1.00 ml of solution was prepared as described above. To each of 5 separate 1.00 ml aliquots was added a different quantity of (Bu$_4$N)$_7$SiW$_9$Nb$_3$O$_{40}$ ranging from 0.78 to 2.0 eq and then the solvent was removed from each sample under vacuum, at room temperature, for 18 h. For each sample, hydrogenolysis of the coordinated COD to yield the active catalyst was accomplished as previously described. After drying (room temperature, high vacuum, 18 h), 2.50 ml dry acetone and 0.50 ml cyclohexane was added to each sample, followed by pressurizing to 40 psig with hydrogen. The rate of olefin hydrogenation was measured, as described under the general kinetics catalyst procedure, at 22° C. The results indicate that maximum stability and catalytic activity is obtained at a 1:1 [(COD)Ir$^+$]:[SiW$_9$Nb$_3$O$_{40}$$^{7-}$] ratio.

Alternatively, excess (Bu$_4$N)$_7$SiW$_9$Nb$_3$O$_{40}$ was added to a given amount of activated 1a to yield mixtures with an [Ir(COD)$^+$]:SiW$_9$Nb$_3$O$_{40}$$^{7-}$ ratio <1. This method was used to check the results presented above.

At Ir$^{(1)}$:SiW$_9$Nb$_3$O$_{40}$$^{7-}$ ratios of <1, (see Table 1, entry 2), the rate of catalysis decreases dramatically, whereas ratios >1 result in the rapid (<15 min) formation of (Ir$^{(0)}$)$_n$, suggesting a supported, covalently bonded Ir$^{(1)}$:SiW$_9$Nb$_3$O$_{40}$$^{7-}$ stoichiometry of 1:1. Thus, to avoid (Ir$^{(0)}$)$_n$ formation and to retain maximum hydrogenation rate, the system of choice is (Bu$_4$N)$_6$[(COD)Ir.SiW$_9$Nb$_3$O$_{40}$] in acetone solution.

EXAMPLE 20

Olefin Hydrogenation.

The catalyst precursors iridium mixed phosphotungstate complex were preactivated by treatment of 0.01–0.02 M acetone solutions of either complex with 40 psig hydrogen for 0.1–1 hour at room temperature. Complete hydrogenation of the coordinate COD is demonstrated by the presence of 1.0±0.05 equivalents cyclooctane determined by GLC. Longer preactivation times or higher temperatures (50° C., 40 psig hydrogen, >10 min) lead to overreduction and Ir$^{(0)}$ formation (Table 1, entry 7), although the polyoxoanions in these complexes significantly inhibit this process.

A survey of the following variables was conducted with the goal of defining a reasonably optimum system for detailed studies: solvent (dry acetone, dry methyl ethyl ketone, propylene carbonate, hexafluoroacetone.3H$_2$O, dry acetonitrile, absolute ethanol, and 1,2-dichloroethane); platinum$^{II}$, palladium$^{II}$, rhodium$^I$ vs. iridium$^I$; different polyoxoanions; and the optimum polyoxoanion:metal ratio. Acetone, iridium, the SiW$_9$Nb$_3$O$_{40}$$^{7-}$ heteropolyanion in the precursor complex, and a 1:1 Ir:polyoxoanion ratio emerged as the preferred embodiment. The optimized polyoxoanion-containing catalyst derived from the iridium mixed silicotungstate complex compares favorably with crabtree's homogeneous catalyst, [IrH$_2$(acetone)$_2$(PPH$_3$)$_2$]PF$_6$, and heterogeneous ultradispersed Ir/$\eta$-Al$_2$O$_3$. It exceeds the turnover rates for crabtree's catalyst by 2.2 fold and the maximum number of turnovers with Crabtree's catalyst by a factor of 31, while approaching the maximum turnover rate exhibited by the ultradispersed Ir/$\eta$-Al$_2$O$_3$ catalyst (Table 1, entries 1, 5, and 8).

Significantly, SiW$_9$Nb$_3$O$_{40}$$^{7-}$ (as in the iridium mixed silicotungstate complex) and P$_2$W$_{15}$Nb$_3$O$_{62}$$^{9-}$ (as in the iridium mixed phosphotungstate complex) greatly inhibit the formation of Ir$^{(0)}$ precipitate. (Table 1, entries 1 and 2). For example, the iridium mixed silicotungstate complex remains as a clear, amber solution even after 25,000 turnovers over 48 hours. When either a polyoxoanion with very little anionic surface charge density was used ((Bu$_4$N)$_6$P$_2$W$_{18}$O$_{62}$=(Bu$_4$N)[(PO$_4$)$_2$$^{6-}$(W$_{18}$O$_{54}$)$^0$]; Table 1, entry 3), or no polyoxoanion was employed (Ir(COD(CH$_3$CN)$_2$]BF$_4$ alone; Table 1, entry 4), a grey/black precipitate indicating (Ir$^{(0)}$)$_n$ formed within 5 minutes. When 2 equivalents SiW$_9$Nb$_3$O$_{40}$$^{7-}$ per equivalent of Ir(COD)$^+$ were preactivated and examined for catalytic activity, the rate was found to be half the hydrogenation rate obtained with the precatalyst iridium mixed silicotungstate complex (Table 1, entry 1a) while an excess of Ir(COD)$^+$ with respect to SiW$_9$Nb$_3$O$_{40}$$^{7-}$ resulted in formation of (Ir$^{(0)}$)$_n$, indicating an optimum Ir:polyoxoanion ratio of 1:1.

An exceedingly powerful probe of homogeneous-soluble catalytic reactions is chemical kinetics. Indeed, this approach is expected to discern between catalysis by a discrete, molecular heteropolyanion-supported iridium complex (such as the formulation proposed for activated iridium mixed silicotungstate complex) and catalysis by other species which perhaps form under hydrogenation conditions (i.e., agglomerated iridium. It is unlikely that the active catalyst is of the general form "Ir$_y$[SiW$_9$Nb$_3$O$_{40}$$^{7-}$]$_x$", y$\neq$x, since greater than 1 equivalent of SiW$_9$Nb$_3$O$_{40}$$^{7-}$ inhibits catalysis and the catalyst has been shown to be anionic). The former case should produce kinetics which are reproducible and first order in catalyst. On the other hand, the latter case would be suspect if any of the following characteristics were observed; an initial induction period, irreproducible rates, or non-first order dependence on catalyst.

The kinetic analysis of cyclohexene hydrogenation, catalyzed by activated iridium mixed silicotungstate complex (activated iridium mixed phosphotungstate was not kinetically investigated due to the competition between olefin hydrogenation and heteropolyanion reduction) at 22° C., and encompassing several different batches of catalyst, has provided the following results: First, under all combinations of initial [cyclohexene], [catalyst], and initial P$_{hydrogen}$ examined, there was no observable induction period as indicated by a plot of $P_{hydrogen}$ vs. time, of which a representative example is shown in FIG. 1.

Second, a gentle curvature of these plots (our FIG. 1A) is indicative of rate dependence on [$H_2$]and/or [cyclohexene]. Furthermore, plotting the initial turnover frequency vs. either initial $P_{hydrogen}$ (and [$H_2$]), FIG. 1c or [catalyst], FIG. 2, yields a straight line of slope = 1 and intercept = 0, thus the mechanism is first order in both $H_2$ and catalyst. Similar treatment of initial turnover frequency at various [cyclohexene] shows saturation kinetics at [cyclohexene] 1.0 M. At [cyclohexene] <1.0 M, initial rates cannot be accurately determined with the apparatus described herein.

Third, initial rate values, expressed as turnover frequency, are remarkably reproducible (±15%) even for different batches of activated iridium mixed silicotungstate complex. Such a high degree of reproducibility has not been obtained with $(Ir^{(0)})_n$ (from overreduced iridium mixed silicotungstate complex or overreduced [Ir(COD)(CH_3CN)_2]BF_4) as expected. Typical error bars are ±30-50% for material obtained from a single preparation while samples from different preparations have given apparent turnover frequencies (uncorrected for surface area) ranging from 50 to 3100 $h^{-1}$.

Due to the poor degree of reproducibility of initial hydrogenation rates catalyzed by $(Ir^{(0)})_n$, a kinetic analysis of this system does not yield readily interpreted results. For example, changing the initial hydrogen pressure from 20-65 psig does not result in a significant (greater than experimental error) change in the initial turnover frequency (the same is true for changes (from 1.00-4.95 M) in the initial olefin concentration). However, a plot of $P_{hydrogen}$ vs. time for cyclohexene hydrogenations catalyzed by $(Ir^{(0)})_n$ yields a straight line for at least four half lives (FIG. 1a) indicating zero order dependence on [$H_2$] and [cyclohexene]. These results show a significant difference between hydrogenations catalyzed by activated iridium mixed silicotungstate complex and $(Ir^{(0)})_n$. This kinetic analysis demands that the two catalyst system, activated iridium mixed silicotungstate complex and $(Ir^{(0)})_n$, are different chemical entities.

Figure 1B:
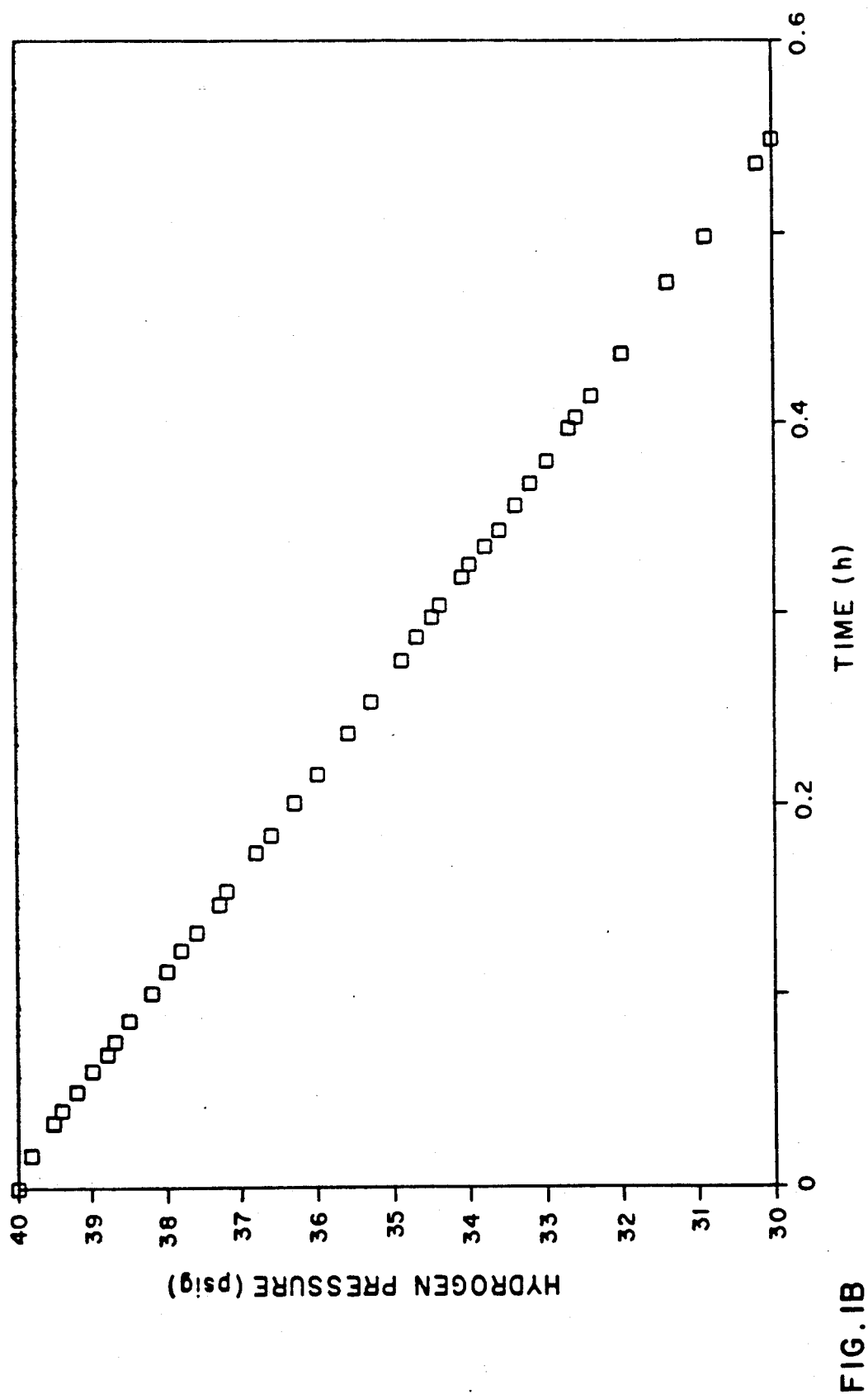
Figure 1C:
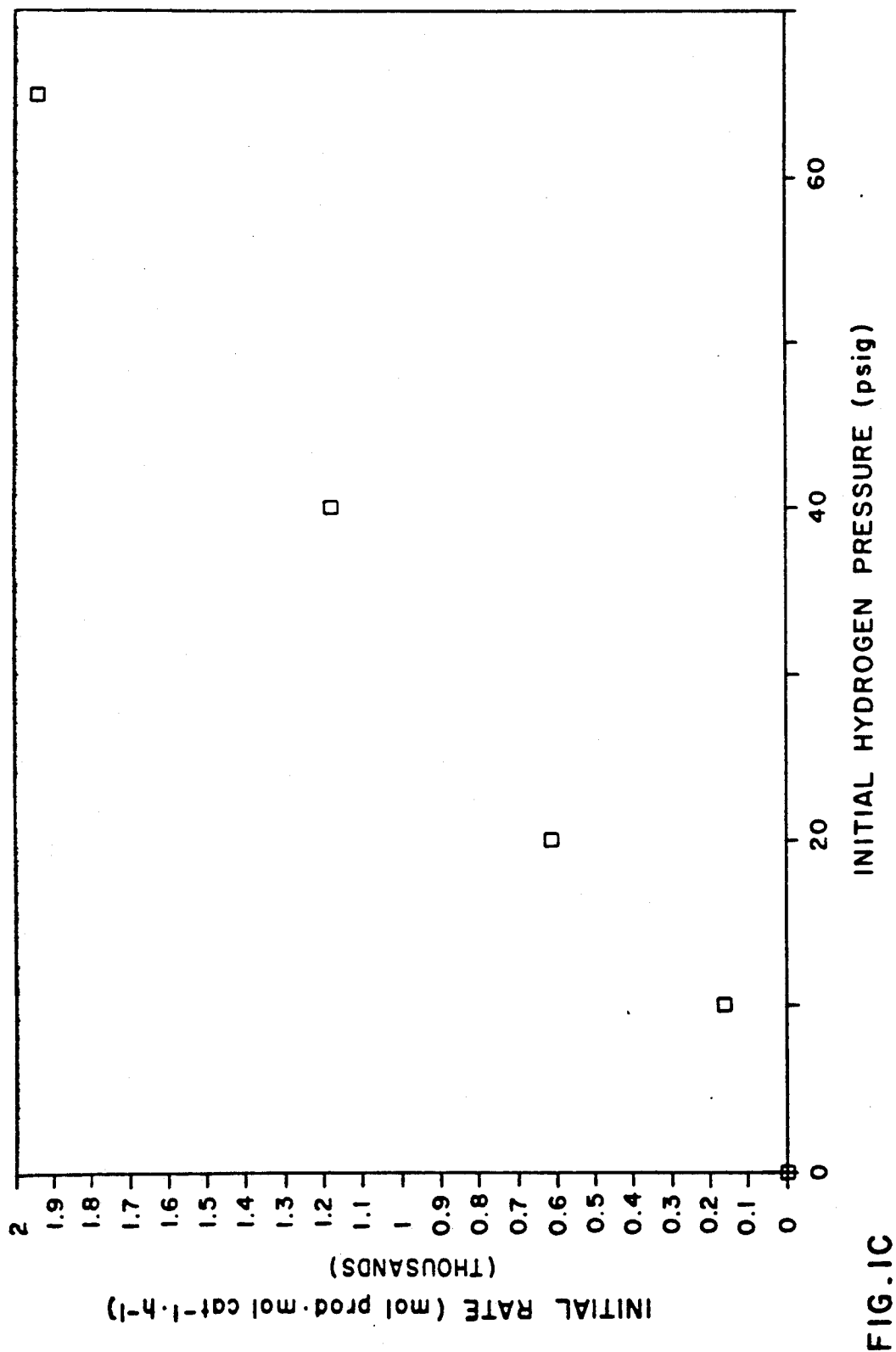
Figure 1D:
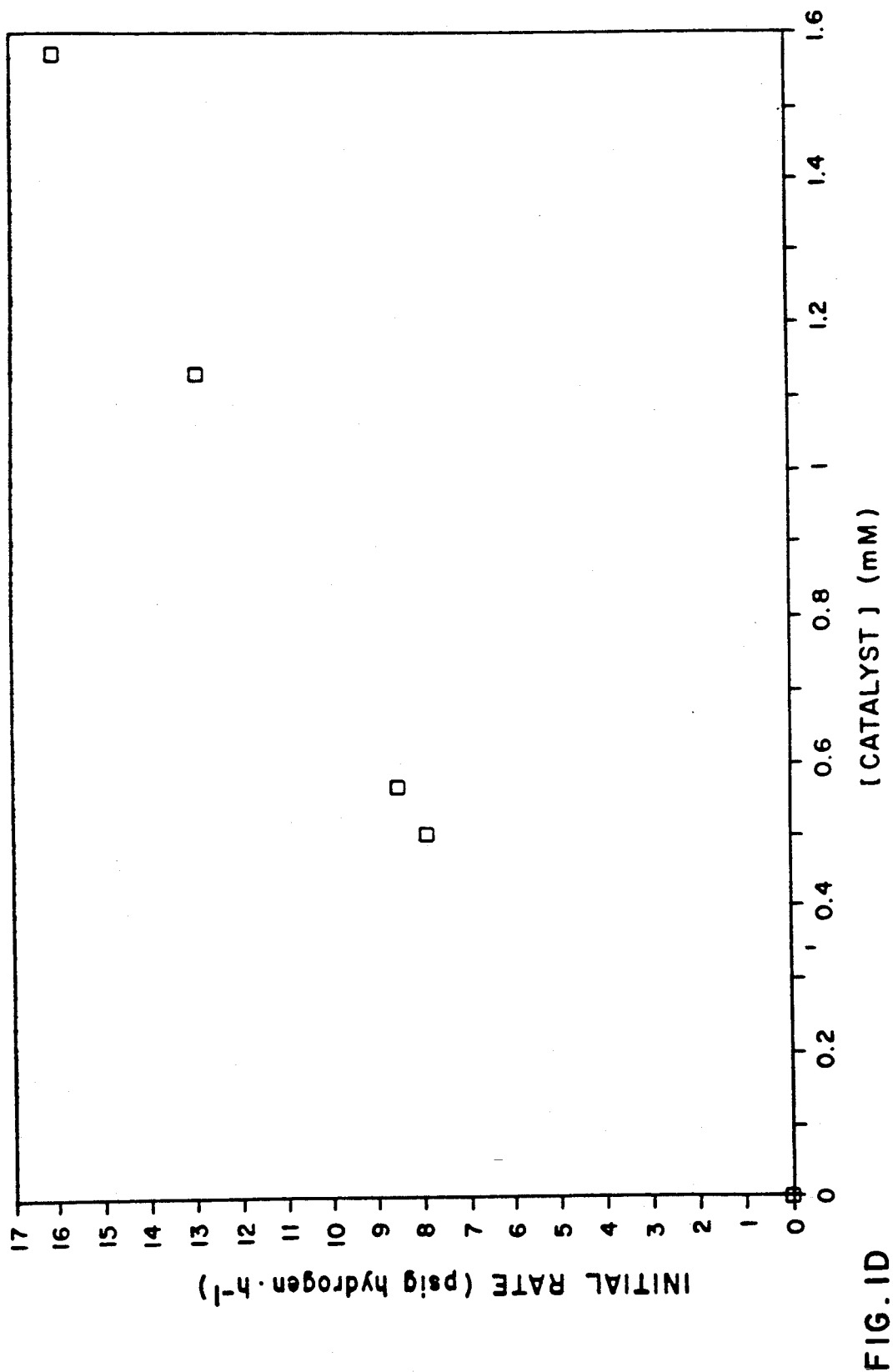
Figure 3:
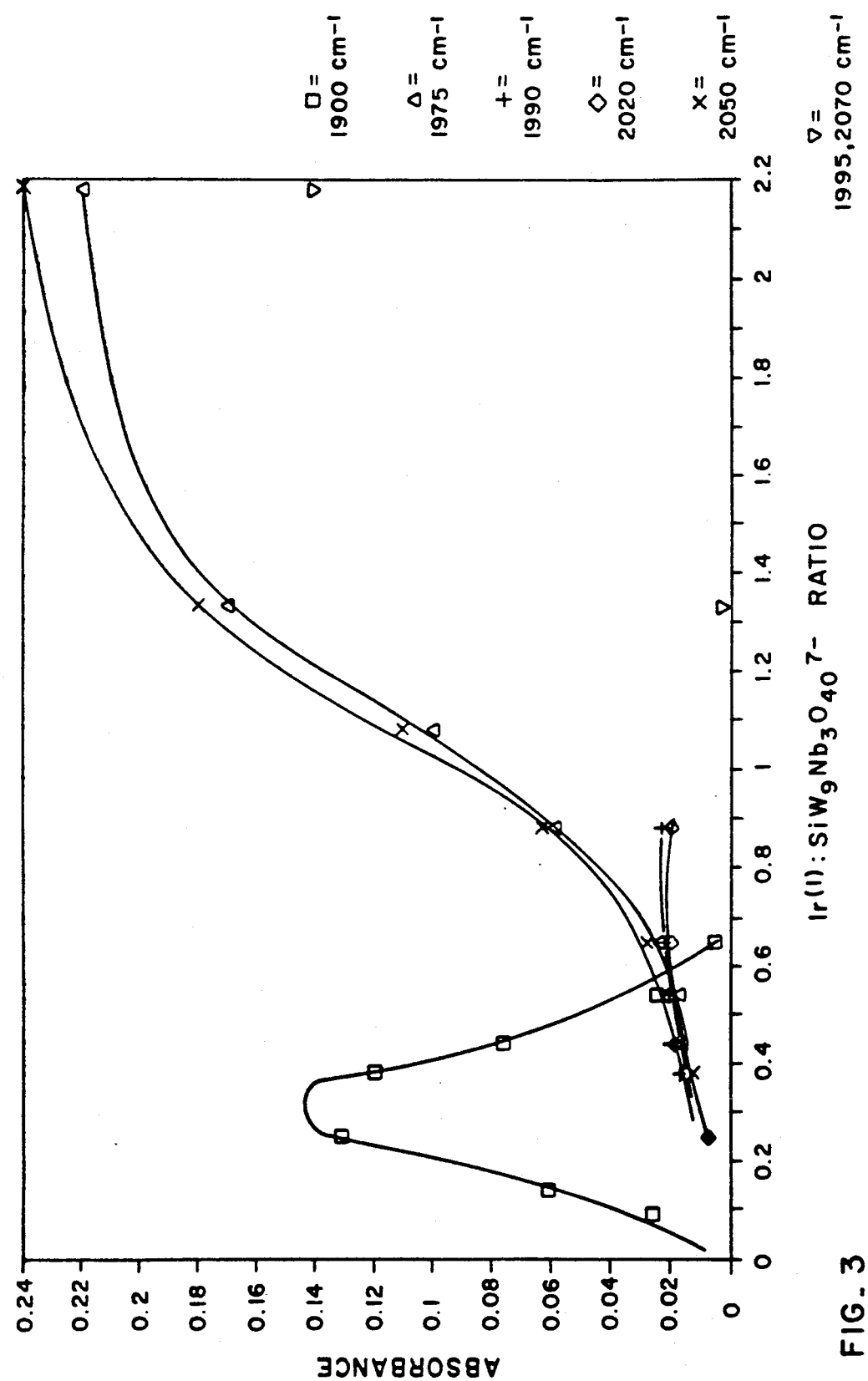
FIG. 3 is a plot of a spectrophotometric titration of a) $SiW_9Nb_3O_{40}^{7-}$ and b) $P_2W_{15}Nb_3O_{62}^{9-}$ with $Ir(COD)^+$ under 40 psig CO.

In comparison, 80% dispersed 1%-Ir/n-Al_2O_3 exhibits zero order dependence on olefin during the first three half lives if the hydrogen pressure is kept above 25 psig (See FIG. 1B). However, dependence on [$H_2$] is observed when the hydrogen pressure drops below 25 psig, even at less than three half lives.

Overall the results are definitive in establishing that the polyoxoanion significantly affects the hydrogenation rate, the total number of turnovers, and the tendency to form an $(Ir^{(0)})_n$ precipitate.

EXAMPLE 21

Preparation of, and Ion Exchange Experiments with, $(Bu_4N)_6[(COD)Ir..SiW_9V_3O_{40}]$ An aetonitrile solution (10 ml) of 868 mg, 0.208 mmol, $(Bu_4N)_7SiW_9V_3O_{40}$ (See Finke, R. G.; Rapko, B.; Domaille, P. J.; Organomet. 1986, 5, 175) was added, with stirring, to an acetonitrile solution (5-10 ml) containing 100 mg, 0.208 mmol, [Ir(COD)(CH_3CN)_2]BF_4 to produce $(Bu_4N)_6[(COD)Ir.SiW_9V_3O_{40}]$ as a green product. The solvents were removed under vacuum and the green solid was dried at room temperature, <0.3 torr vacuum, for 16 hours.

To verify that the (COD)Ir$^+$ moiety is covalently bonded to the $SiW_9V_3O_{40}^{7-}$ moiety, a green acetonitrile solution of $(Bu_4N)_6[(COD)Ir.SiW_9V_3O_{40}]$ was loaded onto first a cation exchange column (Amberlyst A-15 resin) and then an anion exchange column (Amberlyst A-27 resin) and slowly eluted with acetonitrile. The green complex moved through the cation exchange resin with the advancing solvent front, but adhered tightly to the anion exchange column, consistent with the overall anionic charge for the support complex $[(COD)Ir.SiW_9V_3O_{40}]^{6-}$.

EXAMPLE 22

Preparation of, and Ion Exchange Experiments with, $(Bu_4N)_8[(COD)Ir..P_2W_{15}V_3O_{62}]$ An acetonitrile solution (10 ml) containing 1.279 g, 0.208 mmol, $(Bu_4N)_9P_2W_{15}V_3O_{62}$(See Finke, R. G.; Rapko, B.; Saxton, R. J.; Domaille, P. J.; J. Am. Chem. Soc. 1986, 108, 2947) was added, with stirring, to an acetonitrile solution (5-10 ml) of 100 mg., 0.208 mmol, [Ir(COD)(CH_3CN)_2]BF_4. The solvents were removed under vacuum followed by 16 hours drying at room temperature and <0.3 torr vacuum to yield a green solid formulated as $(Bu_4N)_8[(COD)Ir.P_2W_{15}V_3O_{62}]$.

Ion exchange experiments, analogous to those described above, were performed with $(Bu_4N)_8[(COD)Ir.P_2W_{15}V_3O_{62}]$. The results (tight bonding of the orange complex to anion exchange resin, no interaction with cation exchange resin) are consistent with covalent bonding between (COD)Ir$^+$ and $P_2W_{15}V_3O_{62}^{9-}$ to yield the overall anionic complex $[(COD)Ir.P_2W_{15}V_3O_{62}]^{8-}$.

EXAMPLE 23 Control Experiment Showing That Low Surface-Charge-Density Heteropolyanions Such As $(Bu_4N)_4SiW_{12}O_{40}$ Will Not Stabilize Ir$^{(1)}$ With Respect to Reduction to Ir$^{(0)}$.

An acetone solution of 2.2 mg (0.00469 mmol) [Ir(COD)(CH_3CN)_2]BF_4 was freshly prepared in a N_2 glove bag as described in Example 4. To this solution was added 18.1 mg $(Bu_4N)_4SiW_{12}O_{40}$ (0.00469 mmol) and 0.50mL (4.94 mmol) cyclohexene, and the solution was then placed inside a pressure vessel for catalytic hydrogenation testing (these manipulations were also done inside of the N_2-filled glove bag). After capping, the pressure vessel containing the [Ir(COD)(CH_3CN)_2]$^+$ and $SiW_{12}O_{40}^{4-}$ was removed from the glove bag and pressurized to 40 psig with H_2. The vessel was then placed in a 22° C. controlled-temperature water bath.

Within 5 minutes the solution was black and contained a very finely divided black precipitate (presumably Ir$^{(0)}$). After 0.50 hr the pressure had decreased by 5.8 psig and $^1$H NMR indicated 72% hydrogenation to cyclohexane. This high hydrogenation rate of 1510 turnovers/h, taken with the appearance of a black precipitate, is most consistent with the rapid formation of Ir$^{(0)}$ precipitate.

EXAMPLE 24

Effect of Solvent on the Catalytic Activity of $[L_nIr.Heteropolyanion]^{y-}$ (Heteropolyanion = $SiW_9Nb_3O_{40}^{7-}$, y=6; and $P_2W_{15}Nb_3O_{62}^{9-}$, y=8) and Urabe's Catalyst (RhCl(PPh_3)_3 plus $SiW_{12}O_{40}^{4-}$).

The optimum solvent for catalytic hydrogenation of cyclohexene with catalysts derived by activation of the precursors $[L_n.SiW_9M_3O_{40}]^{6-}$ and $L_n.P_2W_{15}M_3O_{62}]^{8-}$ (M = V$^V$, Nb$^V$) is acetone. In this solvent the initial hydrogenation rate with catalytically activated $([L_n \sim SiW_9Nb_3O_{40}]^{6-}$ is 1150 turnovers/hr (see Example 20). The iridium mixed phosphotungstate and iridium mixed silicotungstate catalyst precursors are insoluble in benzene and similar non-polar solvents and consequently exhibit no catalytic activity in these solvents.

In contrast, Urabe's catalyst system, an equal molar mixture of $RhCl(PPh_3)_3$ and $SiW_{12}O_{40}^{4-}$, is very active in benzene but inactive in acetone. For example, 1.15 mg (0.00124 mmol) $RhCl(PPh_3)_3$ and 4.73 mg (0.00123 mmol) $(Bu_4N)_4SiW_{12}O_{40}$ dissolved slowly in a mixture of 2.50 mL benzene and 0.50 mL (4.94 mmol) cyclohexene. The solution was placed under 40 psig $H_2$ in a glass pressure vessel equipped with a pressure gauge accurate to +/−0.09 psig. The vessel was placed in a controlled-temperature water bath at 22° C. and stirred vigorously.

The $H_2$ pressure was monitored as a function of time. After 0.611 hr the pressure had decreased by 0.9 psig and $^1H$ NMR confirmed that a portion of the cyclohexene had been hydrogenated. Comparison of the integrated area of the cyclohexane proton peak to the integrated area of the cyclohexene olefinic proton peaks provided a determination of the extent of hydrogenation; 7% in this case. The average turnover rate is then calculated to be 470 turnovers/hr.

This experiment was repeated by dissolving 3.41 mg (0.00368 mmol) $RhCl(PPh_3)_3$ and 14.03 mg (0.00365 mmol) $(Bu_4N)_4SiW_{12}O_{40}$ in a mixture of 2.50 mL acetone and 0.50 mL cyclohexene (solutes dissolved rapidly as opposed to the slow dissolution in the benzene solution). No hydrogenation had occurred (by $H_2$ pressure drop or $^1H$ NMR) after 0.500 hr indicating essentially no catalytic activity in acetone.

EXAMPLE 25

Effect of Added $SiW_{12}O_{40}^{4-}$ on the Catalytic Activity of Urabe's Catalyst.

To the catalytically active benzene solution of 1.15 mg $RhCl(PPh_3)_3$ and 4.73 mg $(Bu_4N)_4SiW_{12}O_{40}$, prepared as described above in Example 24, was added an additional 5.34 mg (0.00124 mmol) $(Bu_4N)_4SiW_{12}O_{40}$. The $H_2$ pressure was restored to 40 psig and the pressure monitored as a function of time. After 0.833 hr the pressure had decreased by 1.3 psig and $^1H$ NMR indicated (by the method described in Example 24) that an additional 9% hydrogenation of the cyclohexene had occurred. The average turnover rate then, for the catalyst after addition of $SiW_{12}O_{40}^{4-}$ (to give a total of 2 equivalents $SiW_{12}O_{40}^{4-}$), was 405 turnovers/hr. This value is probably not significantly different from the average turnover rate with one equivalent of $SiW_{12}O_{40}^{4-}$.

This result is in marked contrast to the effect of additional equivalents of the basic heteropolyanion $SiW_9Nb_3O_{40}^{7-}$ on the catalytic activity of the iridium mixed silicotungstate complex (see Examples 19 and 20), and suggests a weak rather than a strong (covalent) chemical interaction between $RhCl(PPh_3)_3$ and $SiW_{12}O_{40}^{4-}$.

EXAMPLE 26

Control Experiment Demonstrating a Lack of Covalent Bonding Between $RhCl(PPh_3)_3$ and $SiW_{12}O_{40}^{4-}$.

To check the hypothesis that only weak (non-covalent) chemical interactions are shared by $RhCl(PPh_3)_3$ and $SiW_{12}O_{40}^{4-}$, the catalytically-active benzene solution containing Urabe's catalyst, prepared as described in Example 25, was subjected to the ion-exchange test (see Examples 12, 21, and 22). Thus, Amberlyst A-15 cation exchange resin (about 0.5 mL in volume; previously washed with aqueous $Bu_4NOH$, then distilled water, then acetone) was added to the catalytically-active benzene solution of $RhCl(PPh_3)_3$ and $SiW_{12}O_{40}^{4-}$, and the $H_2$ pressure restored to 40 psig. Addition of the ion exchange resin was done on the bench top by ceasing to stir the catalyst solution, quickly opening the pressure vessel, adding the ion-exchange resin, closing the vessel, and immediately purging 5-10 times with $H_2$ prior to reinstating vigorous stirring of the solution. This technique did not allow sufficient air into the catalyst solution to significantly alter catalytic activity (as determined by experiments in which the catalytic activity of the iridium mixed silicotungstate was unaffected, see below).

After 0.25 hr the yellow-orange color of the solution was taken up by the cation exchange resin, indicating removal of the $Rh^I$ from the solution. One half hour after addition of the cation exchange resin no additional hydrogenation had occurred, consistent with the removal of the catalytically active $Rh^I$ from solution.

Repeating this experiment with a catalytically active solution of the iridium mixed silicotungstate (0.00185 mmol based on the catalyst precursor) in 2.50 mL acetone and 0.50 mL cyclohexene (4.94 mmol) gave the following observations. Addition of about 0.5 mL in volume of the cation exchange resin Amberlyst A-15 (in the $Bu_4N+$-loaded form, washed with acetone), followed by stirring under 40 psig $H_2$ for 0.50 hr had no effect on the color of the solution or the hydrogenation rate (still 1150 turnovers/hr).

However, addition of Amberlyst A-27 anion exchange resin (loaded in the $Cl^-$ form, washed with acetone) to a similar solution, followed by pressurizing to 40 psig with hydrogen, resulted in loss of color of the solution in 15 min. The catalytic activity of the solution also decreased significantly; this experiment was repeated three times and the catalytic activity after treatment with anion exchange resin decreased to 10% of the initial rate (i.e., 0–110 turnovers/hr).

These results are consistent with covalent bonding of the $Ir^{(1)}$ moiety to the basic polyoxoanion $SiW_9Nb_3O_{40}^{7-}$ resulting in an anionic catalyst. Whereas Urabe's catalyst system is lacking this covalent bonding interaction between $Rh^I$ and the non-basic polyoxoanion $SiW_{12}O_{40}^{4-}$, the catalyst is the cationic $Rh^I$ complex.

While the invention has been described with reference to particularly preferred embodiments, it will be apparent to those skilled in the art that other variations are possible which are still within the scope of the appended claims.

TABLE 1

| Entry | Precatalyst | Appearance Upon $H_2$ Addition | Initial Turnover Frequency[a] (22° C.) | Maximum No. of Turnovers Demonstrated |
|---|---|---|---|---|
| 1a | $[L'_nIr \cdot SiW_9Nb_3O_{40}]^{7-}$ | Clear amber soln. | 1150 ± 175 | 25,500 |
| 1b | $[L'_nIr \cdot SiW_9Nb_3O_{40}]^{7} +$ | Clear amber | 550 ± 80 | — |

TABLE 1-continued

| Entry | Precatalyst | Appearance Upon H$_2$ Addition | Initial Turnover Frequency$^a$ (22° C.) | Maximum No. of Turnovers Demonstrated |
|---|---|---|---|---|
|  | 1 eq. (Bu$_4$N)$_7$SiW$_9$Nb$_3$O$_{40}$ | soln. |  |  |
| 2 | [L'$_n$Ir · P$_2$W$_{15}$Nb$_3$O$_{62}$]$^{9-}$ | Clear amber | 480 ± 75 | 2,550 |
| 3 | Ir(COD)CH$_3$CN)$_2$$^+$BF$_4$$^-$ + (Bu$_4$N)$_6$P$_2$W$_{18}$O$_{62}$ | Grey/blk. ppt. forms within 5 min. | 1050–1600$^b$ | — |
| 4 | Ir(COD)CH$_3$CN)$_2$$^+$BF$_4$$^-$ | Grey/blk. ppt. forms immediately | 3400–4500$^c$ | 51,600 |
| 5 | IrH$_2$S$_2$(PPH$_3$)$_2$$^+$PF$_6$$^-$ S = acetone | Clear pale yellow soln. | 530 ± 80$^d$ | 810 |
| 6 | Low Dispersion Ir/γ-Al$_2$O$_3$ | Grey suspension | 3900 ± 1000 | 410,000 |
| 7 | Overreduced [L'$_2$Ir · SiW$_9$Nb$_3$O$_{40}$]$^{7-}$ (40 psig H$_2$, 22° C., 2 hrs) | Amber soln. with blk. ppt. | 1750–2780$^b$ | 15,000 |
| 8 | Ultradispersed Ir/η-Al$_2$O$_3$ | Grey suspension | 1740 ± 300 | — |

$^a$Expressed as mol product · mol catalyst$^{-1}$ · h$^{-1}$
$^b$The surface area of the (Ir$^{(0)}$)$_n$ precipitate in these entries is unknown and probably varies greatly with sample preparation. Consequently, turnover frequencies are calculated assuming that all the Ir present is catalytically active which is surely not true. Hence, these values represent lower limits while the true value may be ≥4500 turnsover/h, assuming similar surface area and activity as entry 4. BET surface area measurements were not obtained on these samples due to the large amount of material required for analysis.
$^c$The turnover frequency and total number of turnovers were calculated for a sample of Ir$^{(0)}$ for which both the BET surface area and hydrogenation rate data had been obtained. Different batches of (Ir$^{(0)}$)$_n$ prepared from overreduction of [(Ir(COD)(CH$_3$CN)$_2$]BF$_4$ show vastly different hydrogenation rates (values, uncorrected for surface area, range from 50–1600 turnovers/h) which probably reflects a large variation in the surface area of the precipitated metal.
$^d$Inactive in acetone (as previously reported) and most active in chlorinated hydrocarbon solvents; therefore, 1,2-dichloroethane was used as solvent for this entry only.

turnsover/h, assuming similar surface area and activity as entry 4. BET surface area measurements were not obtained on these samples due to the large amount of material required for analysis. c) The turnover frequency and total number of turnovers were calculated for a sample of Ir$^{(0)}$ for which both the BET surface area and hydrogenation rate data had been obtained. Different batches of (Ir$^{(0)}$)$_n$ prepared from overreduction of [(Ir(COD)(CH$_3$CN)$_2$]BF$_4$ show vastly different hydrogenation rates (values, uncorrected for surface area, range from 50–1600 turnovers/h) which probably reflects a large variation in the surface area of the precipitated metal. d) Inactive in acetone (as previously reported) and most active in chlorinated hydrocarbon solvents; therefore, 1,2-dichloroethane was used as solvent for this entry only.

TABLE 2

| Test$^a$ | Catalyst | | | |
|---|---|---|---|---|
|  | Activated 1 | (IR$^{(0)}$)$_n$ | Low Dispersion 1%-Ir/γ-Al$_2$O$_3$ | Ultradispersed 1%-Ir/η-Al$_2$O$_3$ |
| CO | Inhibitor | Inhibitor | Inhibitor | Inhibitor |
| Anion Exchange Resin | Inhibitor | No Effect | No Effect | No Effect |
| COD | Inhibitor | No Effect | No Effect | Inhibitor |
| CH$_3$CN | Inhibitor | No Effect | No Effect | Inhibitor |
| Et$_3$N | Inhibitor | No Effect | No Effect | — |
| 2.0 eq PPh$_3$$^c$ | 2.0 ± 0.1 | — | 1.5 | <<0.35 |
| Air | Inhibitor | No Effect | No Effect | Inhibitor |
| PhNO$_2$$^d$ | Not Reduced | 15% Reduced to Aniline | 16% Reduced to Aniline | Not Reduced |
| Benzene$^d$ | Not Reduced | 5% Reduced to Cyclohexane | 5% Reduced to Cyclohexane | Not Reduced |
| 2,3-Dimethyl-2-Butene$^d$ | Not Reduced | 55% Reduced to Dimethylbutane | 48% Reduced to Dimethylbutane | 30% Reduced to Dimethylbutane |
| Reproducibility ± 15% of Kinetics |  | ±35%$^e$ | — | — |
| Max No. of. Turnovers$^c$ | 25,500 | 51,600 | 410,000 | — |

$^a$See text for a description of these classification tests and results.
$^b$CO treatment of activated 1 results in 100 ± 5% recovery of iridium as the dicarbonyl 3.
$^c$Equivalents required to completely inhibit catalytic activity.
$^d$Product yields were measured by 1 H NMR after 2 hours reaction time. Not reduced means no product was detected.
$^e$This degree of reproducibility (±35%) could only be obtained within a given batch of (Ir$^{(0)}$)$_n$. Reproducibility between different batches was ±95% (see footnote C, Table 1).

TABLE 3

Polyoxoanion and Solvent Variations for the Olefin Hydrogenation Hydrogenation Catalyst System [L$_x$Ir.(polyoxoanion)]$_n$

| Solvent | Polyoxoanion | Hydrogenation Rate$^a$ |
|---|---|---|
| 1,2-dichloroethane | (Bu$_4$N)$_7$SiW$_9$Nb$_3$O$_{40}$ | Inactive |
| Me$_2$SO | (Bu$_4$N)$_7$SiW$_9$Nb$_3$O$_{40}$ | Inactive |
| THF | (Bu$_4$N)$_7$SiW$_9$Nb$_3$O$_{40}$ | 80 Turnovers/h |
| EtOH | (Bu$_4$N)$_7$SiW$_9$Nb$_3$O$_{40}$ | 100 Turnovers/h |
| CH$_3$CN | (Bu$_4$N)$_7$SiW$_9$Nb$_3$O$_{40}$ | 210 Turnovers/h |
| MeC(O)Et | (Bu$_4$N)$_7$SiW$_9$Nb$_3$O$_{40}$ | 530 Turnovers/h |
| Propylene Carbonate | (Bu$_4$N)$_7$SiW$_9$Nb$_3$O$_{40}$ | 285 Turnovers/h |

TABLE 3-continued

Polyoxoanion and Solvent Variations for the Olefin Hydrogenation Hydrogenation Catalyst System $[L_xIr.(polyoxoanion)]_n$

| Solvent | Polyoxoanion | Hydrogenation Rate$^a$ |
|---|---|---|
| Acetone | $(Bu_4N)_7SiW_9Nb_3O_{40}$ | 1150 Turnovers/h |
| Acetone | $(Bu_4N)_9P_2W_{15}Nb_3O_{62}$ | 480 Turnovers/h |
| Acetone | $(Bu_4N)_7SiW_9V_3O_{40}$ | Inactive |
| Acetone | $(Bu_4N)_9P_2W_{15}V_3O_{62}$ | Inactive |

$^a$Initial rate for the catalytic hydrogenation of cyclohexene at 22° C. and an initial hydrogen pressure of 40 psig.

What is claimed is:

1. A catalyst precursor which comprises:

$$A_x[L_nIr^{(1)}.X_2M_{15}M'_3O_{62}]^{x-}$$

wherein
- A is a countercation;
- L is an olefinic ligand or dioxygen;
- $Ir^{(1)}$ is monovalent iridium;
- n = 1 or 2;
- X is a hetero atom selected from the group consisting of B, Si, Ge, P, As, Se, Te, I, Co, Mn and Cu;
- M = W or Mo;
- M' = Nb, V, Ti, Zr, Ta or Hf; and,
- x < 15.

2. The catalyst precursor of claim 1 wherein L is cyclooctadiene.

3. The catalyst precursor of claim 1 wherein A is tetrabutyl ammonium.

4. A catalyst precursor which comprises:

$$A_y[L_nIr^{(1)}.X_2M_9M'_3O_{40}]^{y-}$$

wherein
- A is a countercation;
- L is an olefinic ligand or dioxygen;
- $Ir^{(1)}$ is monovalent iridium;
- n = 1 or 2;
- X is a hetero atom selected from the group consisting of B, Si, Ge, P, As, Se, Te, I, Co, Mn and Cu;
- M = W or Mo;
- M' = Nb, V, Ti, Zr, Ta or Hf; and,
- y < 15.

5. The catalyst precursor of claim 4 wherein L cyclooctadiene.

6. The catalyst precursor of claim 4 wherein A is tetrabutyl ammonium.

7. A hydrogenation catalyst precursor which comprises $$A^{+8}[L_nIr.P_2W_{15}Nb_3O_{62}]^{8-}$$

wherein A is a countercation selected from the group consisting of tetraalkyl ammonium cations or alkali metal cations, L is an olefinic ligand, and n is 1 or 2.

8. A hydrogenation catalyst precursor which comprises $$A^{+6}[L_nIr.SiW_9Nb_3O_{40}]^{8-}$$

wherein A is a countercation selected from the group consisting of tetraalkyl ammonium cations or alkali metal cations, L is an olefinic ligand, and n is 1 or 2.

9. A hydrogenation catalyst precursor prepared by
a) reacting $(Bu_4N)_9P_2W_{15}Nb_3O_{62}$ with $[Ir(COD)(CH_3CN)_2]BF_4$ under nitrogen in the presence of acetonitrile to obtain $(Bu_4N)_8[Ir(COD).P_2W_{15}Nb_3O_{62}]+Bu_4NBF_4$; and
b) treating $(Bu_4N)_8Ir(COD).P_2W_{15}Nb_3O_{62}]$ with acetone at 40 psig $H_2$, 25° C. for up to two hours to obtain $[(Bu_4N_8(L'_nIr.P_2W_{15}Nb_3O_{62})]$ $(Bu_4N)_8[L'_nIr.P_2W_{15}Nb_3O_{62}]+$cyclooctane where L'is an olefinic ligand and n is 1 or 2.

10. A hydrogenation catalyst prepared by
a) reacting $(Bu_4N)_7SiW_9Nb_3O_{40}$ with $[Ir(COD)(CH_3CN)_2]BF_4$ under nitrogen in the presence of acetonitrile to obtain $(Bu_4N)_6[Ir(COD).SiW_9Nb_3O_{40}]$ and $Bu_4NBF_4$; and
b) treating $(Bu_4N)_6[Ir(COD).SiW_9Nb_3O_{40}]$ with acetone at 40 psig $H_2$, 25° C. for up to two hours to obtain $(BU_4N)_6(L'_nIr.SiW_9Nb_3O_{40}]$ and cyclooctane where L' is an olefinic ligand and n is 1 or 2.

11. The hydrogenation catalyst precursor of claim 7 wherein A is a countercation selected from the group consisting of alkali metal cations.

12. The hydrogenation precursor of claim 8 wherein A is a countercation selected from the group consisting of monovalent alkali metal cations.

* * * * *